(12) United States Patent
Lockhart et al.

(10) Patent No.: US 12,690,948 B2
(45) Date of Patent: **\*Jul. 28, 2026**

(54) SYSTEMS FOR CHRONOLOGICALLY TRACKING DENTAL TREATMENT MODALITIES FOR A PLURALITY OF PATIENTS

(71) Applicants: Bryan Allen Lockhart, Charlotte, NC (US); Lauren Rennick Lockhart, Charlotte, NC (US)

(72) Inventors: Bryan Allen Lockhart, Charlotte, NC (US); Lauren Rennick Lockhart, Charlotte, NC (US)

( \* ) Notice: Subject to any disclaimer, the term of this patent is extended or adjusted under 35 U.S.C. 154(b) by 611 days.

This patent is subject to a terminal disclaimer.

(21) Appl. No.: 18/145,761

(22) Filed: Dec. 22, 2022

(65) Prior Publication Data

US 2023/0128310 A1 Apr. 27, 2023

Related U.S. Application Data

(63) Continuation-in-part of application No. 17/039,562, filed on Sep. 30, 2020, now Pat. No. 11,564,775.

(51) Int. Cl.
A61C 7/00 (2006.01)
A61C 7/08 (2006.01)

(52) U.S. Cl.
CPC .............. A61C 7/002 (2013.01); A61C 7/08 (2013.01)

(58) Field of Classification Search
CPC .................................................... A61C 7/002
See application file for complete search history.

(56) References Cited

U.S. PATENT DOCUMENTS

| | | | |
|---|---|---|---|
| 11,564,775 B2 | 1/2023 | Lockhart et al. | |
| 2004/0248066 A1* | 12/2004 | Recigno | A61C 9/0046 |
| | | | 433/213 |
| 2005/0182773 A1* | 8/2005 | Feinsmith | G06Q 30/02 |
| 2008/0215176 A1* | 9/2008 | Borovinskih | G06Q 50/04 |
| | | | 700/117 |

(Continued)

FOREIGN PATENT DOCUMENTS

| | | | | |
|---|---|---|---|---|
| WO | WO-2018140159 A1 * | 8/2018 | | A61C 7/002 |

*Primary Examiner* — Suresh Suryawanshi

(74) *Attorney, Agent, or Firm* — Carr & Ferrell LLP; James M. Nachtwey

(57) ABSTRACT

Systems for chronologically tracking patient dental treatment modalities for a plurality of patients including dental aligner production and manufacture. A device may display a three-dimensional model of the series of the modified teeth positions from the starting teeth positions, the three-dimensional model being used to fabricate a dental device that causes the starting teeth positions of the patient to physically change to the desired teeth positions according to the treatment plan. A device may display a graphical user interface for the chronologically tracking patient dental treatment modalities for the plurality of patients, the graphical user interface for the chronologically tracking patient dental treatment modalities for the plurality of patients comprising: a first row of cells containing a first subject heading displaying pending review status, the pending review being a status of doctor evaluation of the treatment plan for the patient dental treatment modalities.

20 Claims, 28 Drawing Sheets

(56) References Cited

U.S. PATENT DOCUMENTS

| | | | |
|---|---|---|---|
| 2013/0110545 A1* | 5/2013 | Smallwood | G16H 10/60 |
| | | | 705/3 |
| 2014/0350963 A1* | 11/2014 | Kinlen | G16H 40/20 |
| | | | 705/2 |
| 2016/0220200 A1* | 8/2016 | Sandholm | A61B 5/4848 |
| 2018/0368954 A1 | 12/2018 | Katzman | |
| 2019/0333644 A1* | 10/2019 | Lamarre | G16H 10/60 |
| 2020/0113650 A1* | 4/2020 | Lemchen | G16H 10/60 |
| 2021/0158607 A1 | 5/2021 | Katzman | |
| 2021/0298874 A1 | 9/2021 | Katzman | |
| 2021/0353386 A1 | 11/2021 | Raby | |
| 2022/0096206 A1 | 3/2022 | Lockhart et al. | |

* cited by examiner

CP DUALINE

Demo

Dashboard

| | |
|---|---|
| Ready For Loading | 44 |
| Dr Review | 11 |
| Needs Printing | 28 |
| Needs Thermoform | 1 |
| Needs Trim and Polish | 0 |
| Needs Packaging | 0 |
| Case Ready | 3 |
| Case Completed | 29 |
| Due Soon | 12 |

Dashboard

300

Ready for Loading  ← → Calendar View

Show 10 entries                                          Search:

| Date | Patient Location | First Name | Last Name | Treatment Type | Scan By | Scan Date | Software Name | Current Status | Next Status | Due Date | Actions |
|---|---|---|---|---|---|---|---|---|---|---|---|
| May/13/2020 | DIDO | Quinton | XXXXX | Spacing | Maria Paz | May/13/2020 | uLAB | Ready for Loading | Dr Review | Jun/15/2020 | X ← → |
| May/13/2020 | DIO | Afton | XXXXX | Crowding | Karen Cubas | May/13/2020 | uLAB | Ready for Loading | Dr Review | No Set Yet | X ← → |
| May/13/2020 | DIO | Treaunda | XXXXX | Crowding | Maria Paz | May/13/2020 | uLAB | Ready for Loading | Dr Review | No Set Yet | X ← → |
| May/13/2020 | DIO | Milton | XXXXX | Crowding | Karen Cubas | May/13/2020 | uLAB | Ready for Loading | Dr Review | No Set Yet | X ← → |
| May/13/2020 | DIO | Lakiesha | XXXXX | Open Bite | Maria Paz | May/13/2020 | uLAB | Ready for Loading | Dr Review | No Set Yet | X ← → |
| May/17/2020 | DIO | Khadijia | XXXXX | Class 11 | Karen Cubas | May/17/2020 | uLAB | Ready for Loading | Dr Review | No Set Yet | X ← → |
| May/17/2020 | DIO | Jana | XXXXX | Crowding | Maria Paz | May/17/2020 | uLAB | Ready for Loading | Dr Review | No Set Yet | X ← → |
| May/17/2020 | DIO | Tania | XXXXX | Crowding | Karen Cubas | May/17/2020 | uLAB | Ready for Loading | Dr Review | Oct/01/2020 | X ← → |
| May/17/2020 | DIO | Elizabeth | XXXXX | Crowding | Karen Cubas | May/17/2020 | uLAB | Ready for Loading | Dr Review | No Set Yet | X ← → |
| May/17/2020 | DIO | Nicole | XXXXX | Crowding | Amanda Taboada | May/17/2020 | uLAB | Ready for Loading | Dr Review | No Set Yet | X ← → |

FIRST PREV (1) 2 3 4 5 NEXT LAST

Figure 4:
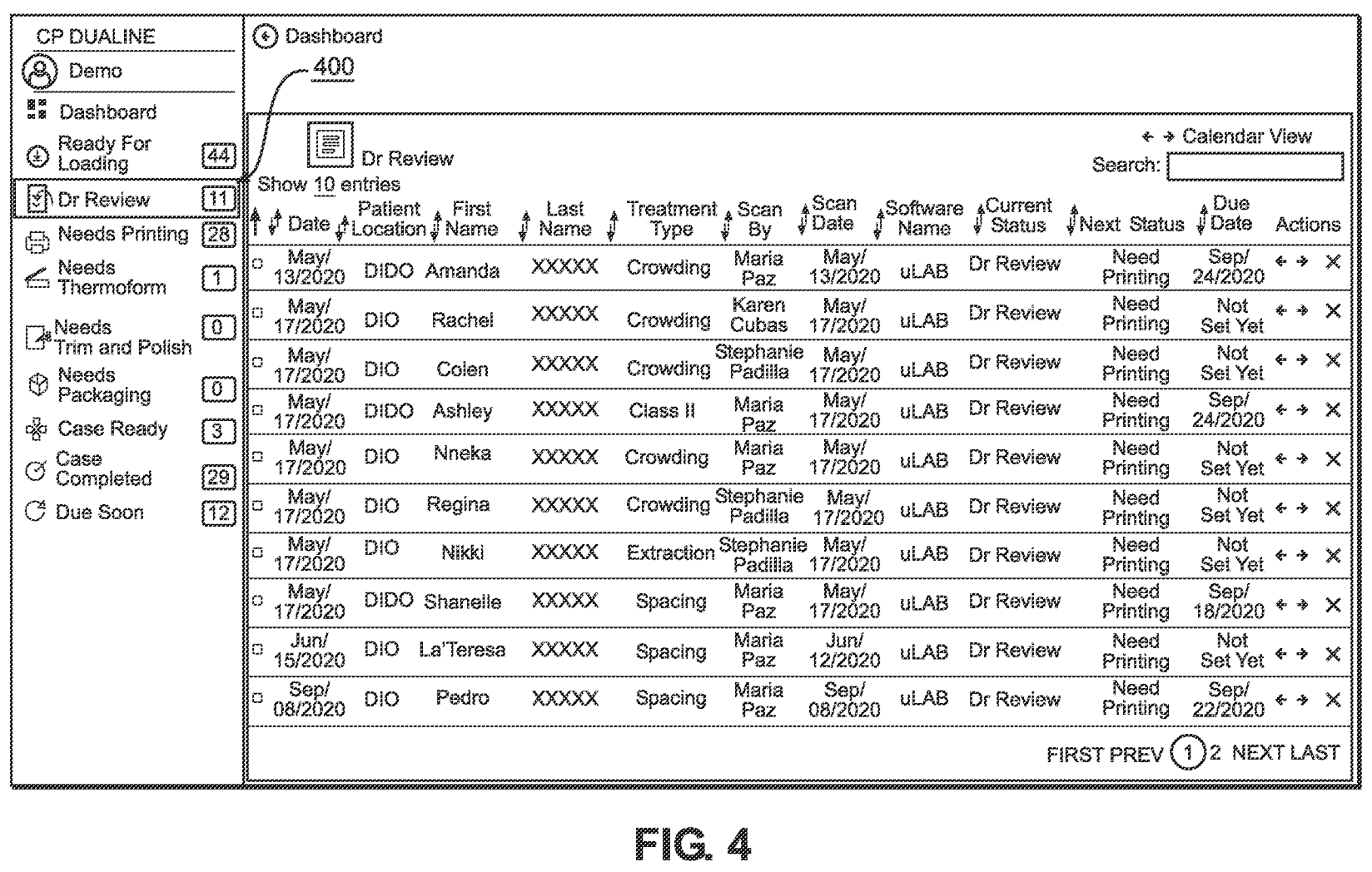

CP DUALINE

Demo

Dashboard
- Dashboard
- Ready For Loading [44]
- Dr Review [11]

Dr Review

400

Show 10 entries

Search: ← → Calendar View

| Date | Patient Location | First Name | Last Name | Treatment Type | Scan By | Scan Date | Software Name | Current Status | Next Status | Due Date | Actions |
|---|---|---|---|---|---|---|---|---|---|---|---|
| May/13/2020 | DIDO | Amanda | XXXXX | Crowding | Maria Paz | May/13/2020 | uLAB | Dr Review | Need Printing | Sep/24/2020 | X ← → |
| May/17/2020 | DIO | Rachel | XXXXX | Crowding | Karen Cubas | May/17/2020 | uLAB | Dr Review | Need Printing | Not Set Yet | X ← → |
| May/17/2020 | DIO | Colen | XXXXX | Crowding | Stephanie Padilla | May/17/2020 | uLAB | Dr Review | Need Printing | Not Set Yet | X ← → |
| May/17/2020 | DIDO | Ashley | XXXXX | Class II | Maria Paz | May/17/2020 | uLAB | Dr Review | Need Printing | Sep/24/2020 | X ← → |
| May/17/2020 | DIO | Nneka | XXXXX | Crowding | Maria Paz | May/17/2020 | uLAB | Dr Review | Need Printing | Not Set Yet | X ← → |
| May/17/2020 | DIO | Regina | XXXXX | Crowding | Stephanie Padilla | May/17/2020 | uLAB | Dr Review | Need Printing | Not Set Yet | X ← → |
| May/17/2020 | DIO | Nikki | XXXXX | Extraction | Stephanie Padilla | May/17/2020 | uLAB | Dr Review | Need Printing | Not Set Yet | X ← → |
| May/17/2020 | DIDO | Shanelle | XXXXX | Spacing | Maria Paz | May/17/2020 | uLAB | Dr Review | Need Printing | Sep/18/2020 | X ← → |
| Jun/15/2020 | DIO | La'Teresa | XXXXX | Spacing | Maria Paz | Jun/12/2020 | uLAB | Dr Review | Need Printing | Not Set Yet | X ← → |
| Sep/08/2020 | DIO | Pedro | XXXXX | Spacing | Maria Paz | Sep/08/2020 | uLAB | Dr Review | Need Printing | Sep/22/2020 | X ← → |

Needs Printing [28]
Needs Thermoform [1]
Needs Trim and Polish [0]
Needs Packaging [0]
Case Ready [3]
Case Completed [29]
Due Soon [12]

FIRST PREV ① 2 NEXT LAST

Figure 7:
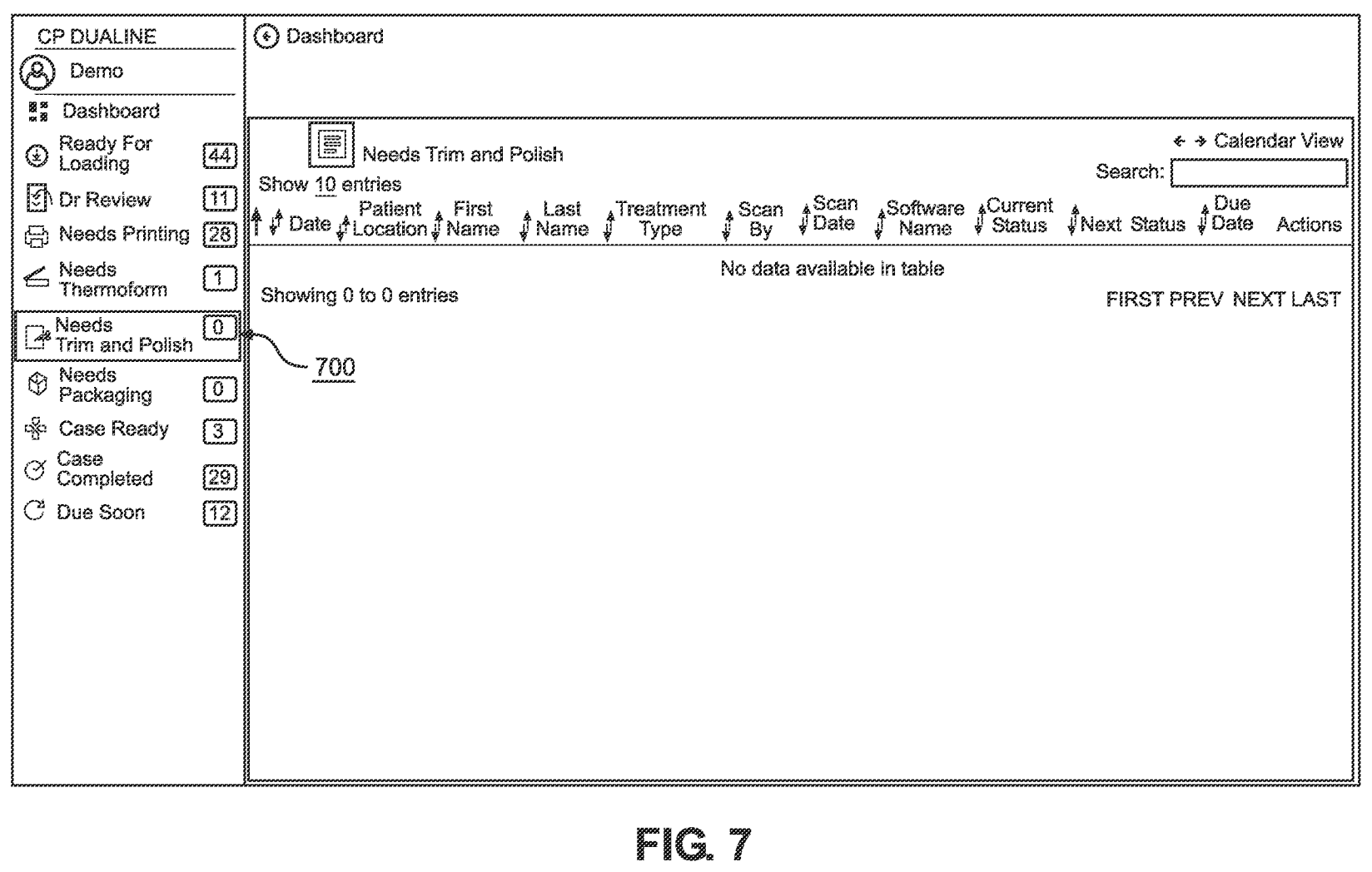

⊙ Dashboard

CP DUALINE
Ⓐ Demo
▦▪ Dashboard
⊙ Ready For
　 Loading　　[44]
▣ Dr Review　　[11]
▱ Needs Printing　[28]
◿ Needs
　 Thermoform　[1]
▱ Needs
　 Trim and Polish　[0]
⬡ Needs
　 Packaging　　[0]
✤ Case Ready　[3]
⟳ Case
　 Completed　[29]
↻ Due Soon　[12]

▣ Needs Trim and Polish

Show 10 entries

Search: [          ]

↕ → Calendar View

| ↑↓ Date ↕ Patient Location | First Name ↕ | Last Name ↕ | Treatment Type ↕ | Scan By ↕ | Scan Date ↕ | Software Name ↕ | Current Status ↕ | Next Status ↕ | Due Date ↕ | Actions |
|---|---|---|---|---|---|---|---|---|---|---|

No data available in table

Showing 0 to 0 entries

700

FIRST PREV NEXT LAST

CP DUALINE

⊘ Demo

⊙ Dashboard

Dashboard

| | |
|---|---|
| ⊙ Ready For Loading | 44 |
| ⧉ Dr Review | 11 |
| ⊡ Needs Printing | 28 |
| ↙ Needs Thermoform | 1 |
| ⊡ Needs Trim and Polish | 0 |
| ⊘ Needs Packaging | 0 |
| ✤ Case Ready | 3 |
| ⊙ Case Completed | 29 |
| ⊙ Due Soon | 12 |

⊙ Dashboard

▦ Case Completed

Show 10 entries

| Date | Patient Location | First Name | Last Name | Treatment Type | Scan By | Scan Date | Software Name | Current Status | Next Status | Due Date | Actions |
|---|---|---|---|---|---|---|---|---|---|---|---|
| ☐ May/17/2020 | DIO | Jaqueline | XXXXX | Crowding | Amanda Taboada | May/17/2020 | uLAB | Case Completed | Not Set Yet | Not Set Yet | ← → ✕ |
| ☐ May/17/2020 | DIO | Reggie | XXXXX | Class III | Stephanie Padilla | May/17/2020 | uLAB | Case Completed | Not Set Yet | Not Set Yet | ← → ✕ |
| ☐ May/17/2020 | DIO | Dibania | XXXXX | Spacing | Karen Cubas | May/17/2020 | uLAB | Case Completed | Not Set Yet | Not Set Yet | ← → ✕ |
| ☐ May/17/2020 | DIDO | Julia | XXXXX | Class II | Maria Paz | May/17/2020 | uLAB | Case Completed | Not Set Yet | Not Set Yet | ← → ✕ |
| ☐ May/17/2020 | DIO | Meghan | XXXXX | Crowding | Karen Cubas | May/17/2020 | uLAB | Case Completed | Not Set Yet | Not Set Yet | ← → ✕ |
| ☐ May/17/2020 | DIO | Bryon | XXXXX | Class III | Amanda Taboada | May/17/2020 | uLAB | Case Completed | Not Set Yet | Jun/11/2020 | ← → ✕ |
| ☐ May/17/2020 | DIO | Savannah | XXXXX | Crowding | Amanda Taboada | May/17/2020 | uLAB | Case Completed | Not Set Yet | Not Set Yet | ← → ✕ |
| ☐ May/17/2020 | DIO | Bryan | XXXXX | Class II | Karen Cubas | May/17/2020 | uLAB | Case Completed | Not Set Yet | Not Set Yet | ← → ✕ |
| ☐ May/17/2020 | DIO | Carole | XXXXX | Crowding | Stephanie Padilla | May/17/2020 | uLAB | Case Completed | Not Set Yet | Not Set Yet | ← → ✕ |
| ☐ May/17/2020 | DIO | Darwin | XXXXX | Spacing | Karen Cubas | May/17/2020 | uLAB | Case Completed | Not Set Yet | Not Set Yet | ← → ✕ |

1000   Showing 1 to 10 or 29 entries

FIRST PREV ① 2 3 NEXT LAST

↔ → Calendar View

Search: ▭

FIG. 10

CP DUALINE
Demo
Dashboard
Ready For Loading [44]
Dr Review [11]
Needs Printing [28]
Needs Thermoform [1]
Needs Trim and Polish [0]
Needs Packaging [0]
Case Ready [3]
Case Completed [29]
Due Soon [12]

Dashboard

Calendar View

Due Soon    Search:

Show 10 entries

| Date | Patient Location | First Name | Last Name | Treatment Type | Scan By | Scan Date | Software Name | Current Status | Next Status | Due Date | Actions |
|---|---|---|---|---|---|---|---|---|---|---|---|
| May/13/2020 | DIDO | Amanda | XXXXX | Crowding | Maria Paz | May/13/2020 | uLAB | Dr Review | Needs Printing | Sep/24/2020 | ⇆ ⇄ X |
| May/17/2020 | DIO | Jorge | XXXXX | Crowding | Stephanie Padilla | May/17/2020 | uLAB | Needs Printing | Thermoform | Sep/21/2020 | ⇆ ⇄ X |
| May/17/2020 | DIO | Maya | XXXXX | Crowding | Karen Cubas | May/17/2020 | uLAB | Ready For Loading | Dr Review | Sep/30/2020 | ⇆ ⇄ X |
| May/17/2020 | DIDO | Ashley | XXXXX | Class II | Maria Paz | May/17/2020 | uLAB | Dr Review | Needs Printing | Sep/24/2020 | ⇆ ⇄ X |
| May/17/2020 | DIO | Natalia | XXXXX | Spacing | Stephanie Padilla | May/17/2020 | uLAB | Ready For Loading | Dr Review | Sep/22/2020 | ⇆ ⇄ X |
| May/17/2020 | DIO | Jean | XXXXX | Spacing | Maria Paz | May/17/2020 | uLAB | Ready For Loading | Dr Review | Sep/21/2020 | ⇆ ⇄ X |
| Sep/08/2020 | DIO | Pedro | XXXXX | Spacing | Maria Paz | Sep/08/2020 | uLAB | Dr Review | Needs Printing | Sep/22/2020 | ⇆ ⇄ X |

1100

Showing 1 to 7 of 7 entries

FIRST PREV (1) NEXT LAST

LIGHTFORCE   Dashboard   Patients   Academy   Marketing

Dr. Bryan & Lauren Lockhart
Dual Image Orthodontics

Patients

Add New Patient

Q Search

| | Patient Name ∧ | Patient ID | Status | Shipped On ∨ | Actions |
|---|---|---|---|---|---|
| | Asencio, Marissa | SNKYK | SHIPPED | 7/14/22 | View LightPlan |
| | Little, Kalsey | 3TW5C | SHIPPED | 7/12/22 | View LightPlan |
| | Perez, Allison | EP9XX | SHIPPED | 7/9/22 | View LightPlan |
| | Scantlebury, Aislinn | YIXUK | SHIPPED | 7/8/22 | View LightPlan |
| | Maries (Clear), Sarah | KP8WY | SHIPPED | 7/6/22 | View LightPlan |
| | Garcia, Lindsey | 2NKC5 | SHIPPED | 7/5/22 | View LightPlan |

All Patients
Waiting On Patient
Active
Planning
Pending Review(8)
Pending Re-Approval(1)
In Manufacturing
Shipped — 2200
On Hold(1)
Cancelled
Archive

| Move Record | | | | | | | | + Add Patient |
|---|---|---|---|---|---|---|---|---|
| Search: | | | Show 10 ⊕ | | | | | |
| Select ⌃⌄ Date | ⌃ First ⌄ Name | ⌃ Last ⌄ Name | ⌃ Patient ⌄ Location | ⌃ Treatment ⌄ Type | ⌃ Doctor ⌄ Name | ⌃ Scan ⌄ Date | ⌃ Software ⌄ name | ⌃ Due ⌄ Date | Stage | Actions |
| ☐ | Torian | Sitton | DIDO | | B Lockhart | | | 04/14/2022 | Ready for Loading | ✏ 🗑 |
| ☐ | Jovan | Barker | | | B Lockhart | | | 04/21/2022 | Case Ready | ✏ 🗑 |
| ☐ | Truman | Clemons | | | B Lockhart | | | 04/26/2022 | Ready for Loading | ✏ 🗑 |
| ☐ | Lydia | Arthur | | | B Lockhart | | | 07/02/2022 | Ready for Loading | ✏ 🗑 |
| ☐ 04/05/2022 | Marquita | Sexton | DIDO | Crowding | B Lockhart | 04/04/2022 | | 07/02/2022 | Case Ready | ✏ 🗑 |
| ☐ | Antonieta | Jardines | DIDO | Crowding | B Lockhart | | | 07/11/2022 | Ready for Loading | ✏ 🗑 |
| ☐ | Ervin | Eddie | | | B Lockhart | | | 07/17/2022 | Case Ready | ✏ 🗑 |
| ☐ | Charlotte | Jeskey | | | B Lockhart | 05/02/2022 | | 07/21/2022 | Ready for Loading | ✏ 🗑 |
| ☐ | Jules | Carter | DIDO | Crowding | B Lockhart | | | 07/23/2022 | Ready for Loading | ✏ 🗑 |

Navigation

Stages

June 2021  < >

Navigation

Stages

| | Sun | Mon | Tue | Wed | Thu | Fri | Sat |
|---|---|---|---|---|---|---|---|
| | 30 | 31 | 1 | 2 | 3 | 4 | 5 |
| | | | Hilda Gurley / Robert Bintu | Ashleigh Beamer / Chinette Stevenson | Janelle Williams / Nia McCaslin / Yaretzi Castillo Vasque | | |
| | 6 | 7 | 8 | 9 | 10 | 11 | 12 |
| | | Syed Shahriyar | Erik Rangel / Patricia Charlton / Sincere Williams | Emily Gillespie / Jade Unser / Jasmine Ballard / View more | Janelle Williams / Nia McCaslin | | |
| | 13 | 14 | 15 | 16 | 17 | 18 | 19 |
| | | Akilah Jones / Eddie Goodwin / Maya Buchner / View more | | Carmellia Jones / Kristin Krupke | Elizabeth Willoughby | | |
| | 20 | 21 | 22 | 23 | 24 | 25 | 26 |
| | | | Lakiesha Blackmon / Leamon Burney Jr | | Aquino Peterson | | |
| | 27 | 28 | 29 | 30 | 1 | 2 | 3 |
| | | | Jackie King | | Jacqueline Lane | | |
| | 4 | 5 | 6 | 7 | 8 | 9 | 10 |

FIG. 28

SYSTEMS FOR CHRONOLOGICALLY TRACKING DENTAL TREATMENT MODALITIES FOR A PLURALITY OF PATIENTS

This Non-Provisional Patent Application is a continuation-in-part of, and claims priority benefit of, U.S. patent application Ser. No. 17/039,562, filed Sep. 30, 2020. The aforementioned disclosure is hereby incorporated by reference herein for all purposes.

FIELD OF THE TECHNOLOGY

The present technology relates generally to dental aligner production. More particularly, and not by limitation, the technology relates to systems and methods for tracking dental aligner production and manufacture for a plurality of patients.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Invisalign® is one of the biggest makers of clear dental aligners to straighten teeth. Recently intellectual property assigned to Invisalign® has expired leaving this field open for competitors to make competing clear dental aligners. Also, three-dimensional (3D) printing has recently become widely available and affordable. Thus, many orthodontists and dentists are joining this field of producing clear dental aligners in-house creating a need for systems for tracking dental aligner production and manufacture.

Existing solutions to track patient data for the status of various steps of dental aligner production include using a spreadsheet program such as Microsoft® Excel® and tracking dental aligner production "by hand" using a white board. These existing solutions are cumbersome, inefficient, and may display information incorrectly and inefficiently. As a result, a user may miss relevant patient data and miss deadlines. Consequently, there is a need for tracking the production and manufacture of clear aligners for a plurality of patients using graphical user interfaces that act as an interactive guide.

SUMMARY OF THE INVENTION

In some embodiments, the present disclosure is directed to a system of one or more computers that can be configured to perform particular operations. In some aspects, the techniques described herein relate to a method for chronologically tracking patient dental treatment modalities for a plurality of patients including dental aligner production and manufacture, the method including: receiving an intra-oral scan including starting teeth positions of a patient and a date of the intra-oral scan; receiving a treatment plan including desired teeth positions of the patient based on the intra-oral scan; generating a series of modified teeth positions from the starting teeth positions based on the treatment plan, the series of modified teeth positions from the starting teeth positions being incremental changes from the starting teeth positions to the desired teeth positions; displaying a three-dimensional model of the series of the modified teeth positions from the starting teeth positions, the three-dimensional model being used to fabricate a dental device that causes the starting teeth positions of the patient to physically change to the desired teeth positions according to the treatment plan; and displaying a graphical user interface for the chronologically tracking patient dental treatment modalities for the plurality of patients, the graphical user interface for the chronologically tracking patient dental treatment modalities for the plurality of patients including: a first row of cells containing a first subject heading displaying pending review status, the pending review being a status of doctor evaluation of the treatment plan for the patient dental treatment modalities including the desired teeth positions of the patient based on the intra-oral scan; a second row of cells containing a second subject heading displaying manufacturing status, the manufacturing status being a status of manufacturing of the dental, the dental device causing the series of modified teeth positions from the starting teeth positions and causing the incremental changes from the starting teeth positions to the desired teeth positions; and a third row of cells containing a third subject heading displaying a shipping status, the shipping status being a status of shipping of the dental device based on the dental treatment modalities.

In some aspects, the techniques described herein relate to a method, wherein the displaying the graphical user interface for the chronologically tracking patient dental treatment modalities including dental aligner production and manufacture for the plurality of patients further includes: a fourth row of cells containing a fourth subject heading displaying a due soon status, the due soon status being a due soon status for the chronologically tracking patient dental treatment modalities for a plurality of patients.

In some aspects, the techniques described herein relate to a method, wherein the displaying the graphical user interface for the chronologically tracking patient dental treatment modalities including dental aligner production and manufacture for the plurality of patients further includes: a calendar view for the chronologically tracking patient dental treatment modalities for a plurality of patients, the calendar view including reminders corresponding to the due soon status.

In some aspects, the techniques described herein relate to a method, wherein the patient dental treatment modalities for the plurality of patients includes at least one of: custom braces, custom retainers, digital communication applications, and commercial clear aligner communications from a digital company, and an in-house dental aligner.

In some aspects, the techniques described herein relate to a method, wherein the displaying the three-dimensional model of the series of modified teeth positions from the starting teeth positions includes loading a patient record for the treatment plan.

In some aspects, the techniques described herein relate to a method, wherein the patient record includes at least one of: an intra-oral photograph, an extra-oral photograph, a digital scan, a digital model, a radiograph, and a document pertaining to a patient record.

In some aspects, the techniques described herein relate to a method, further including: sending the patient record to a digital company; receiving a communication from the digital company in response to the sending the patient record to the digital company; and initiating a modification of the treatment plan based on the receiving the communication from the digital company in response to the sending the patient record to the digital company, wherein the initiating the modification of the treatment is a bilateral real time syncing between the digital company and a centralized digital workflow platform.

In some aspects, the techniques described herein relate to a method, wherein the intra-oral scan is received from an intraoral scanner, the scanner providing the starting teeth positions of the patient.

In some aspects, the techniques described herein relate to a method, further including printing, using a three-dimensional (3D) printer, the dental device causing the series of modified teeth positions from the starting teeth positions and causing the incremental changes from the starting teeth positions to the desired teeth positions.

In some aspects, the techniques described herein relate to a system for chronologically tracking patient dental treatment modalities for a plurality of patients including dental aligner production and manufacture, the system including: an intraoral scanner generating an intra-oral scan including starting teeth positions of a patient and a date of the intra-oral scan; at least one processor; and a memory storing processor-executable instructions, wherein the at least one processor is configured to implement the following operations upon executing the processor-executable instructions: receiving a treatment plan including desired teeth positions of the patient based on the intra-oral scan; generating a series of modified teeth positions from the starting teeth positions based on the treatment plan, the series of modified teeth positions from the starting teeth positions being incremental changes from the starting teeth positions to the desired teeth positions; displaying a three-dimensional model of the series of the modified teeth positions from the starting teeth positions, the three-dimensional model being used to fabricate a dental device that causes the starting teeth positions of the patient to physically change to the desired teeth positions according to the treatment plan; a graphical user interface for the chronologically tracking patient dental treatment modalities for the plurality of patients, the graphical user interface for the chronologically tracking patient dental treatment modalities for the plurality of patients displaying: a first row of cells containing a first subject heading displaying pending review status, the pending review being a status of doctor evaluation of the treatment plan for the patient dental treatment modalities including the desired teeth positions of the patient based on the intra-oral scan; a second row of cells containing a second subject heading displaying manufacturing status, the manufacturing status being a status of manufacturing of the dental, the dental device causing the series of modified teeth positions from the starting teeth positions and causing the incremental changes from the starting teeth positions to the desired teeth positions; and a third row of cells containing a third subject heading displaying a shipping status, the shipping status being a status of shipping of the dental device based on the dental treatment modalities.

In some aspects, the techniques described herein relate to a system, wherein the displaying the graphical user interface for the chronologically tracking patient dental treatment modalities including dental aligner production and manufacture for the plurality of patients further includes: a fourth row of cells containing a fourth subject heading displaying a due soon status, the due soon status being a due soon status for the chronologically tracking patient dental treatment modalities for a plurality of patients.

In some aspects, the techniques described herein relate to a system, wherein the displaying the graphical user interface for the chronologically tracking patient dental treatment modalities including dental aligner production and manufacture for the plurality of patients further includes: a calendar view for the chronologically tracking patient dental treatment modalities for a plurality of patients, the calendar view including reminders corresponding to the due soon status.

In some aspects, the techniques described herein relate to a system, wherein the patient dental treatment modalities for the plurality of patients includes at least one of: custom braces, custom retainers, digital communication applications, and commercial clear aligner communications from a digital company, and an in-house dental aligner.

In some aspects, the techniques described herein relate to a system, wherein the displaying the three-dimensional model of the series of modified teeth positions from the starting teeth positions includes loading a patient record for the treatment plan.

In some aspects, the techniques described herein relate to a system, wherein the patient record includes at least one of: an intra-oral photograph, an extra-oral photograph, a digital scan, a digital model, a radiograph, and a document pertaining to a patient record.

In some aspects, the techniques described herein relate to a system, wherein the at least one processor is further configured to implement the following operations upon executing the processor-executable instructions: sending the patient record to a digital company; receiving a communication from the digital company in response to the sending the patient record to the digital company; and initiating a modification of the treatment plan based on the receiving the communication from the digital company in response to the sending the patient record to the digital company; wherein the initiating the modification of the treatment is a bilateral real time syncing between the digital company and a centralized digital workflow platform.

In some aspects, the techniques described herein relate to a system, further including a three-dimensional (3D) printer, the three-dimensional (3D) printer printing the dental device causing the series of modified teeth positions from the starting teeth positions and causing the incremental changes from the starting teeth positions to the desired teeth positions.

In some aspects, the techniques described herein relate to a non-transitory computer readable medium having embodied thereon instructions being executable by at least one processor to perform operations for chronologically tracking patient dental treatment modalities for a plurality of patients including dental aligner production and manufacture, the operations including: receiving an intra-oral scan including starting teeth positions of a patient and a date of the intra-oral scan; receiving a treatment plan including desired teeth positions of the patient based on the intra-oral scan; generating a series of modified teeth positions from the starting teeth positions based on the treatment plan, the series of modified teeth positions from the starting teeth positions being incremental changes from the starting teeth positions to the desired teeth positions; displaying a three-dimensional model of the series of the modified teeth positions from the starting teeth positions, the three-dimensional model being used to fabricate a dental device that causes the starting teeth positions of the patient to physically change to the desired teeth positions according to the treatment plan; and displaying a graphical user interface for the chronologically tracking patient dental treatment modalities for the plurality of patients, the graphical user interface for the chronologically tracking patient dental treatment modalities for the plurality of patients including: a first row of cells containing a first subject heading displaying pending review status, the pending review being a status of doctor evaluation of the treatment plan for the patient dental treatment modalities including the desired teeth positions of the patient based on the intra-oral scan; a second row of cells containing a second subject heading displaying manufacturing status, the manufacturing status being a status of manufacturing of the dental, the dental device causing the series of modified teeth positions from the starting teeth positions and causing the incremental changes from the starting teeth positions to the desired teeth positions; and a third row of cells containing a third subject heading displaying a shipping status, the shipping status being a status of shipping of the dental device based on the dental treatment modalities.

In some aspects, the techniques described herein relate to a non-transitory computer readable medium, wherein the displaying the three-dimensional model of the series of modified teeth positions from the starting teeth positions includes loading a patient record for the treatment plan; wherein the patient record includes at least one of: an intra-oral photograph, an extra-oral photograph, a digital scan, a digital model, a radiograph, and a document pertaining to a patient record; wherein the operations further include: sending the patient record to a digital company; receiving a communication from the digital company in response to the sending the patient record to the digital company; and initiating a modification of the treatment plan based on the receiving the communication from the digital company in response to the sending the patient record to the digital company; wherein the initiating the modification of the treatment is a bilateral real time syncing between the digital company and a centralized digital workflow platform.

In some aspects, the techniques described herein relate to a non-transitory computer readable medium, wherein the operations further include: printing, using a three-dimensional (3D) printer, the dental device causing the series of modified teeth positions from the starting teeth positions and causing the incremental changes from the starting teeth positions to the desired teeth positions.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 3 illustrates a graphical user interface showing a ready for loading status for tracking dental aligner production and manufacture for the plurality of patients after a user selects a subject heading of ready for loading of FIG. 2, in accordance with various embodiments of the present technology.

FIG. 4 illustrates a graphical user interface showing Dr. review status for tracking dental aligner production and manufacture for the plurality of patients after a user selects a subject heading of Dr. review of FIG. 2, in accordance with various embodiments of the present technology.

FIG. 5 illustrates a graphical user interface showing needs printing status for tracking dental aligner production and manufacture for the plurality of patients after a user selects a subject heading of needs printing of FIG. 2, in accordance with various embodiments of the present technology.

FIG. 6 illustrates a graphical user interface showing needs thermoform status for tracking dental aligner production and manufacture for the plurality of patients after a user selects a subject heading of needs thermoform of FIG. 2, in accordance with various embodiments of the present technology.

FIG. 7 illustrates a graphical user interface showing needs trim and polish status for tracking dental aligner production and manufacture for the plurality of patients after a user selects a subject heading needs trim and polish of FIG. 2, in accordance with various embodiments of the present technology.

FIG. 8 illustrates a graphical user interface showing needs packaging status for tracking dental aligner production and manufacture for the plurality of patients after a user selects a subject heading needs packaging of FIG. 2, in accordance with various embodiments of the present technology.

FIG. 9 illustrates a graphical user interface showing case ready status for tracking dental aligner production and manufacture for the plurality of patients after a user selects a subject heading case ready of FIG. 2, in accordance with various embodiments of the present technology.

FIG. 10 illustrates a graphical user interface showing case completed status for tracking dental aligner production and manufacture for the plurality of patients after a user selects a subject heading case completed of FIG. 2, in accordance with various embodiments of the present technology.

FIG. 11 illustrates a graphical user interface showing due soon status for tracking dental aligner production and manufacture for the plurality of patients after a user selects a subject heading due soon of FIG. 2, in accordance with various embodiments of the present technology.

FIG. 12 illustrates a graphical user interface showing a calendar view for tracking dental aligner production and manufacture for the plurality of patients after a user selects a subject heading calendar view of FIG. 11, in accordance with various embodiments of the present technology.

Figure 18:
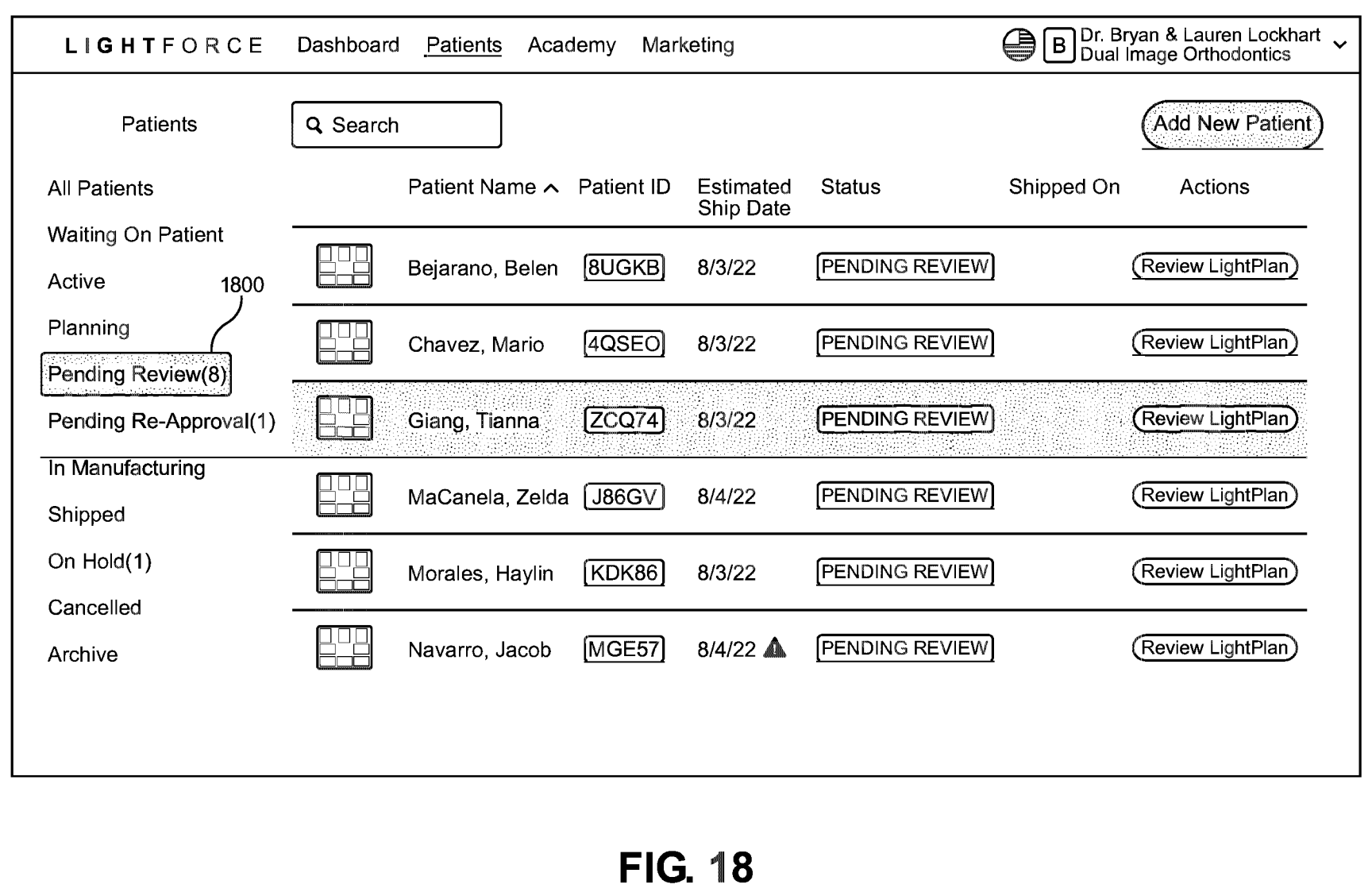

FIG. 18 illustrates a graphical user interface for chronologically tracking patient dental treatment modalities for a plurality of patients after a user selects a subject heading of pending review of FIG. 17, in accordance with various embodiments of the present technology.

FIG. 20 illustrates a graphical user interface for chronologically tracking patient dental treatment modalities for a plurality of patients after a user selects a subject heading of manufacturing status of FIG. 19, in accordance with various embodiments of the present technology.

FIG. 22 illustrates a graphical user interface for chronologically tracking patient dental treatment modalities for a plurality of patients after a user selects a subject heading of shipping status of FIG. 21, in accordance with various embodiments of the present technology.

FIG. 27 illustrates a graphical user interface for chronologically tracking patient dental treatment modalities for a plurality of patients including displaying patient data, in accordance with various embodiments of the present technology.

FIG. 28 illustrates a graphical user interface for chronologically tracking patient dental treatment modalities for a plurality of patients showing a calendar view for the chronologically tracking patient dental treatment modalities for a plurality of patients, the calendar view including reminders corresponding to the due soon status.

DETAILED DESCRIPTION OF THE EMBODIMENTS

Figure 1:
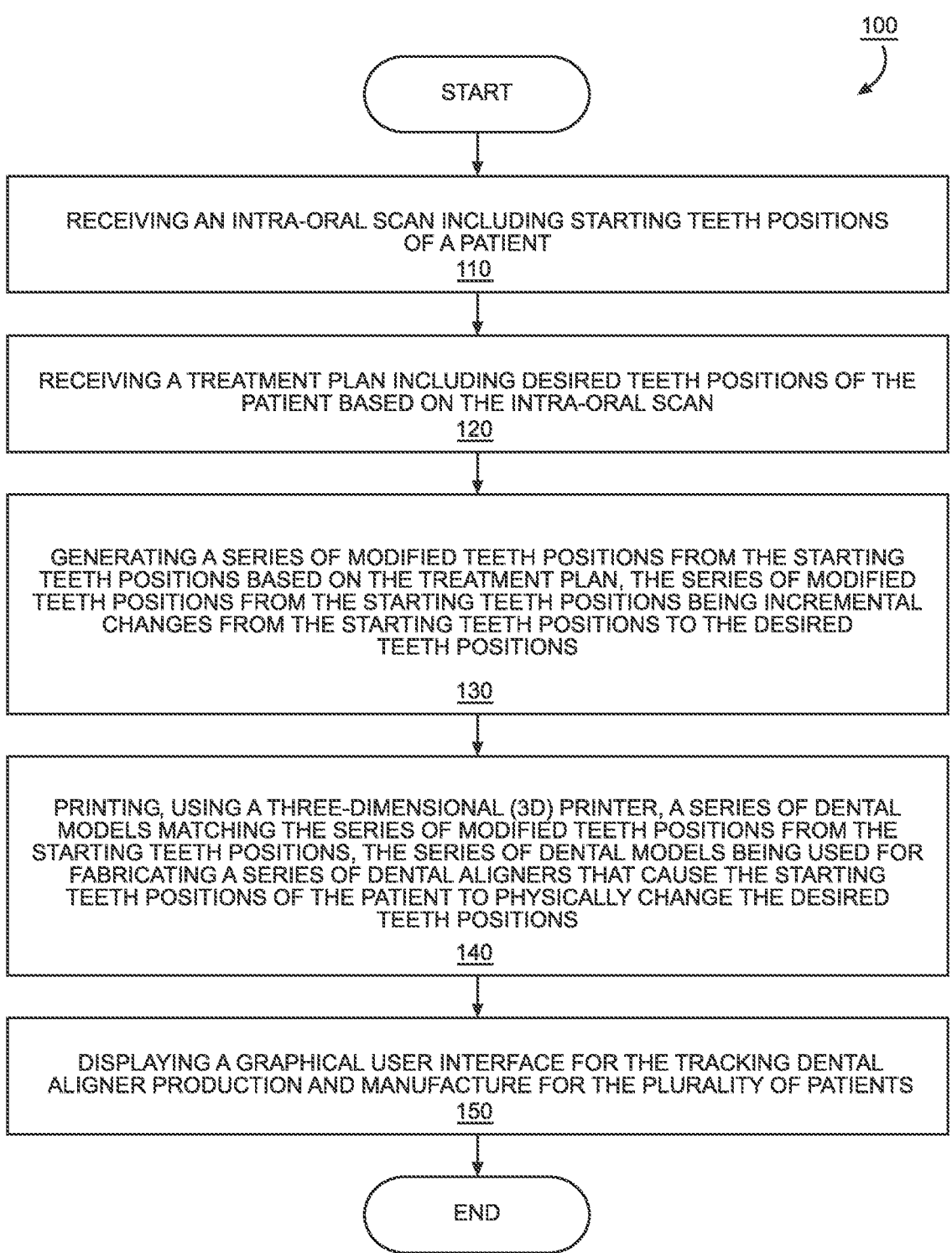
FIG. 1 illustrates a process flow diagram showing a method for tracking dental aligner production and manufacture for a plurality of patients, in accordance with various embodiments of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

In various embodiments systems and methods of the present technology solve the problem of orthodontists not being able to accurately and in real time track dental aligner production and manufacture for a plurality of patients. Existing solutions lack the functionality of tracking in real time which step in the process of dental aligner production each patient case is for a plurality of patients. Patient case or "case" is a dental record or dental chart including data related to treatment of a patient.

Historically, in dental aligner production and manufacture, an orthodontist only completes the initial set-up for each patient case in-house. Every other step of dental aligner production and manufacture is outsourced outside of the office of the orthodontist. In contrast, when manufacturing dental aligners within the office using embodiments of the present technology, the orthodontist is responsible for every step of dental aligner production and manufacture. Orthodontists do not have a way of tracking dental aligner production and manufacture for a plurality of patients efficiently that results in the dental aligners being ready for patients on time, with continual monitoring, and with real-time status updates. For example, existing solutions include updating whiteboards "by hand" or using a spreadsheet program such as Microsoft® Excel® to track patient data including the status of various steps of dental aligner production. These existing solutions are not efficient and are cumbersome for tracking dental aligner production and manufacture for a plurality of patients. The present technology allows an orthodontist to input information for each patient of a plurality of patients and to update the status of each patient in real time to ensure that all patient cases are accurately tracked and delivered on-schedule. The present technology allows a user to display which patient cases are due soon, and to prioritize patient cases using a graphical user interface. For instance, a snapshot of patient flow.

Various embodiments of the present technology generate a dashboard on a graphical user interface that displays an overview of the total number of patient cases entered in the system and how many patient cases are in each category. For instance, a main dashboard. The present technology may allow a user to filter patient data by geographic location, as necessary. For example, when an orthodontist has offices in different geographic locations a user may filter patient data by geographic location of each office as necessary for each user.

In some embodiments the present technology includes a patient card that allows for a user to view how many dental aligners are needed for patient cases, how many dental aligners need to be made for patient cases, an appointment date for each patient, and any special instructions. Each individual category of the present technology may have various sub-categories that break down the name of each patient, software used, scan date, the team member that scanned the patient, as well as the ability to move an individual patient case or a group of patient cases forward or backward to different categories.

In various embodiments of the present technology a user may add photos, radiographs, and digital models to a patient case. For example, a user may insert one or more photos, add one or more X-rays, and add digital models to a patient case using the present technology. The functionality to add this patient data to a patient case allows for all data related to the patient to be organized and easily accessible. For instance, this functionality to add data to a patient case may be particularly useful in an academic setting when a lecturer is discussing the patient case and all the data related to a patient case is easily accessible to the lecturer using the present technology. For example, when all recorded information regarding a patient case including dental history, diagnostic information, clinical notes, and diagnostic scan(s) is available to a lecturer, each patient case is easily discussed. Without this functionality to add data to a patient case, the lecturer is forced to use multiple different programs to access various records for a patient. In contrast, the present technology allows all patient data to be organized and easily accessible to the lecturer.

In some embodiments of the present technology a user may customize a category for a patient case by entering a custom name. Additionally, the present technology allows a user to add or remove categories based on the individual offices. For example, if a dental practice has offices in different geographic locations, a user may display the offices by a selected geographic location.

FIG. 1 illustrates process flow diagram showing a method 100 for tracking dental aligner production and manufacture for a plurality of patients, in accordance with various embodiments of the present technology. The method 100 may be performed by processing logic that may comprise hardware (e.g., dedicated logic, programmable logic, and microcode), software (such as software run on a general-purpose computer system or a dedicated machine), or a combination thereof.

As shown in FIG. 1, the method 100 may commence at operation 110, with receiving an intra-oral scan including starting teeth positions of a patient. The intra-oral scan includes digital impressions that are digital scans of the mouth of a patient to create a map of the teeth and gums of the patient including the starting teeth positions of the patient. The intra-oral scan allows an orthodontist to view the map of the teeth and gums of the patient on a computer screen in a three-dimensional (3D) model, that is more accurate than an X-ray or traditional mold. In some instances, intra-oral scan allows a dentist or an orthodontist to diagnose issues for the teeth of a patient such as overcrowding, gapped teeth, overbites, underbites, crossbites, and open bites, and the like, for a patient. The intra-oral scan may be received from an intraoral scanner, the intraoral scanner providing the starting teeth positions of the patient. Any scanner may be used that can be used to create a map of the teeth and gums of the patient.

At operation 120, the method 100 may proceed with receiving a treatment plan including desired teeth positions of the patient based on the intra-oral scan. For example, the intra-oral scan allows the orthodontist to observe dental issues of the teeth of a patient such as overcrowding, gapped teeth, overbites, underbites, crossbites, and open bites, and the like. Based on the observations of overcrowding, gapped teeth, overbites, underbites, crossbites, and open bites, and the like, of the teeth of the patient, the orthodontist may make a treatment plan. For instance, the treatment plan from an orthodontist to treat a crossbite may start with a series of modified teeth positions from the starting teeth positions to fix the bite issue. Next, the treatment plan from the orthodontist to treat the crossbite may include a series of modified teeth positions to align and expand the width of the dental arches.

At operation 130, the method 100 may include generating a series of modified teeth positions from the starting teeth positions based on the treatment plan, the series of modified teeth positions from the starting teeth positions being incremental changes from the starting teeth positions to the desired teeth positions. For instance, the treatment plan from an orthodontist to treat a crossbite may start with a series of modified teeth positions from the starting teeth positions to fix the bite issue. Next, the treatment plan from the orthodontist to treat the crossbite may include a series of modified teeth positions to align and expand the width of the dental arches.

At operation 140, the method 100 may proceed with printing, using a three-dimensional (3D) printer, a series of dental models matching the series of modified teeth positions from the starting teeth positions, the series of dental models being used for fabricating a series of dental aligners that cause the starting teeth positions of the patient to physically change to the desired teeth positions. For example, the three-dimensional (3D) printer is any 3D printer for additive manufacturing that is used for the construction of a physical dental model from a digital model. Dental aligners are then fabricated from the 3D printed dental models. For instance, the treatment plan from an orthodontist to treat a crossbite may start with a series of modified teeth positions from the starting teeth positions to fix the bite issue. Next, the treatment plan from the orthodontist to treat the crossbite may include a series of modified teeth positions to align and expand the width of the dental arches.

At operation 150, the method 100 may include displaying a graphical user interface for the tracking dental aligner production and manufacture for the plurality of patients. In some embodiments the graphical user interface is a specialized graphical user interface allowing for various displaying of various rows of cells with subject headings for displaying the status of various steps in the process of dental aligner production and manufacture for the tracking dental aligner production and manufacture for the plurality of patients. For example, the specialized graphical user interface may include a focus cell for receiving focus cell activation from the user. For instance, upon activation by the focus cell activation from the user the graphical user interface for the tracking dental aligner production and manufacture for the plurality of patients may display at least one of the status of various steps in the process of dental aligner production and manufacture. For example, displaying the status of at least one of the scan status, the treatment plan status, and the printing status for the plurality of patients.

In various embodiments the graphical user interface for the tracking dental aligner production and manufacture for the plurality of patients may comprise various rows of cells with subject headings displaying the status of various steps in the process of dental aligner production and manufacture as described in FIG. 2 through FIG. 15. For instance, operation 150 of FIG. 1, displaying a graphical user interface for the tracking dental aligner production and manufacture for the plurality of patients. The graphical user interface may comprise various rows of cells with subject headings displaying the status of various steps in the process of dental aligner production and manufacture as described in FIG. 2 through FIG. 15.

Figure 2:
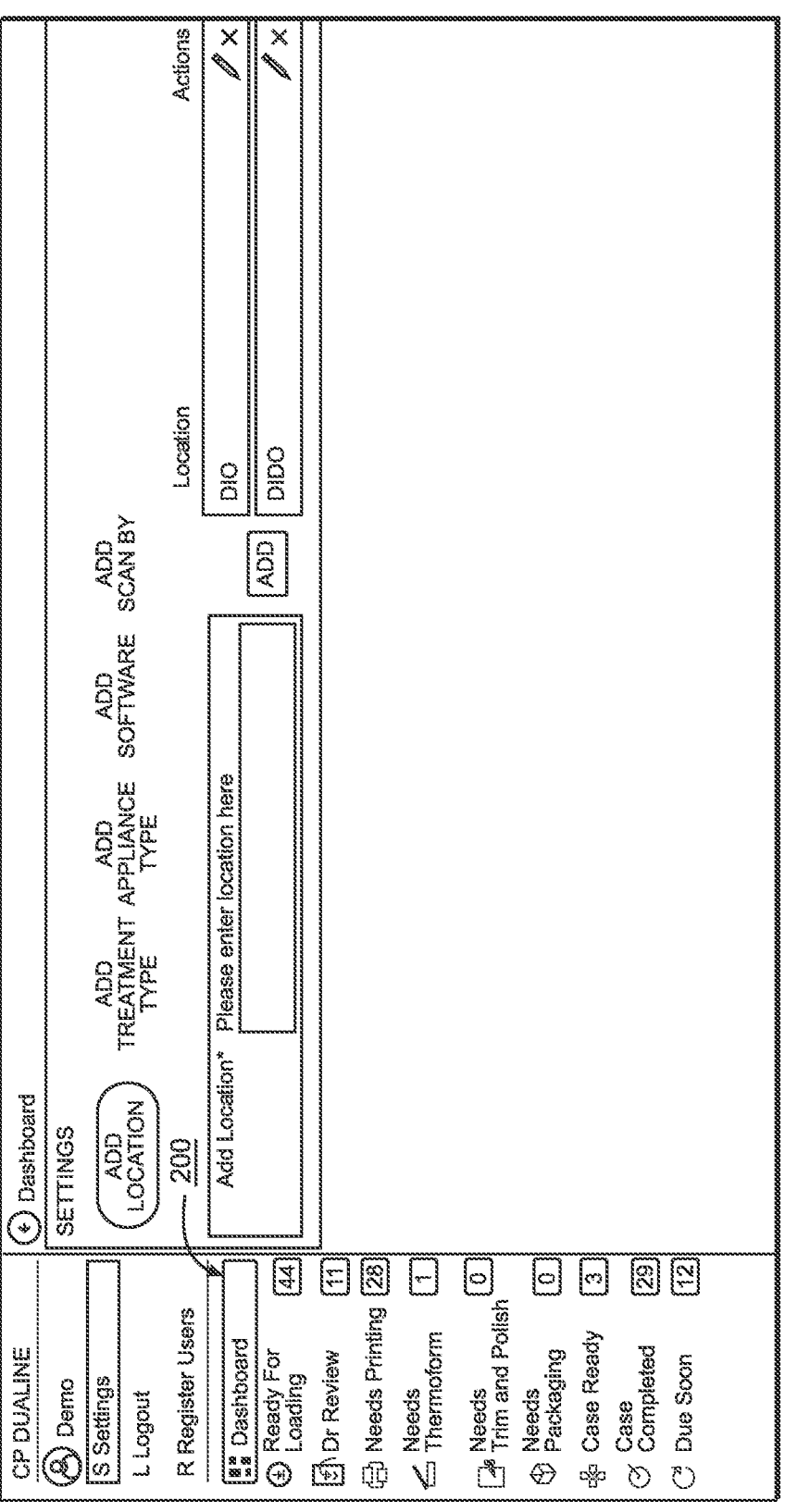
FIG. 2 illustrates a graphical user interface showing a dashboard for tracking dental aligner production and manufacture for the plurality of patients, in accordance with various embodiments of the present technology.

FIG. 2 illustrates a graphical user interface showing a dashboard 200 for tracking dental aligner production and manufacture for a plurality of patients, in accordance with various embodiments of the present technology. The dashboard 200 for tracking dental aligner production and manufacture for the plurality of patients includes various rows of cells with subject headings displaying the status of various steps in the process of dental aligner production and manufacture. For example, the dashboard 200 for tracking dental aligner production and manufacture for a plurality of patients includes various rows of cells with subject headings including a ready for loading status, Dr. review status, needs printing status, needs thermoform status, needs trim and polish status, needs packaging status, case completed status, and due soon status. For example, the various rows of cells with subject headings may include a total number of patients for each status indicator to assist with tracking in real time dental aligner production and manufacture for the plurality of patients.

FIG. 3 illustrates a graphical user interface showing a ready for loading status 300 for tracking dental aligner production and manufacture for the plurality of patients after a user selects the subject heading ready for loading of FIG. 2, in accordance with various embodiments of the present technology. The ready for loading status 300 for tracking dental aligner production and manufacture for the plurality of patients may be displayed after a user selects the subject heading of ready for loading of FIG. 2. For example, the graphical user interface for the tracking dental aligner production and manufacture for the plurality of patients of FIG. 3 displays a first row of cells containing a first subject heading displaying a scan status, the scan status being a status of the receiving the intra-oral scan. For instance, the ready for loading status 300 for tracking dental aligner production and manufacture indicates a status of receiving the intra-oral scan for the plurality of patients as shown in FIG. 3. For instance, a status of operation 110 of FIG. 1, receiving an intra-oral scan including starting teeth positions of a patient for each of the plurality of patients.

FIG. 4 illustrates a graphical user interface showing Dr. review status 400 for tracking dental aligner production and manufacture for the plurality of patients after a user selects a subject heading Dr. review status of FIG. 2, in accordance with various embodiments of the present technology. The Dr. review status 400 for tracking dental aligner production and manufacture for the plurality of patients may be displayed after a user selects the subject heading Dr. review of FIG. 2. For example, the graphical user interface for the tracking dental aligner production and manufacture for the plurality of patients of FIG. 4 displays a second row of cells containing a second subject heading displaying a treatment plan status, the treatment plan status being a status of the receiving a treatment plan including the desired teeth positions of the patient based on the intra-oral scan. For instance, the Dr. review status 400 for tracking dental aligner production and manufacture indicates a status of receiving a treatment plan including the desired teeth positions of the patient based on the intra-oral scan, which are included in the Dr. review for the plurality of patients as shown in FIG. 4. For instance, a status of operation 120 of FIG. 1, receiving a treatment plan including desired teeth positions of the patient based on the intra-oral scan.

Figure 5:
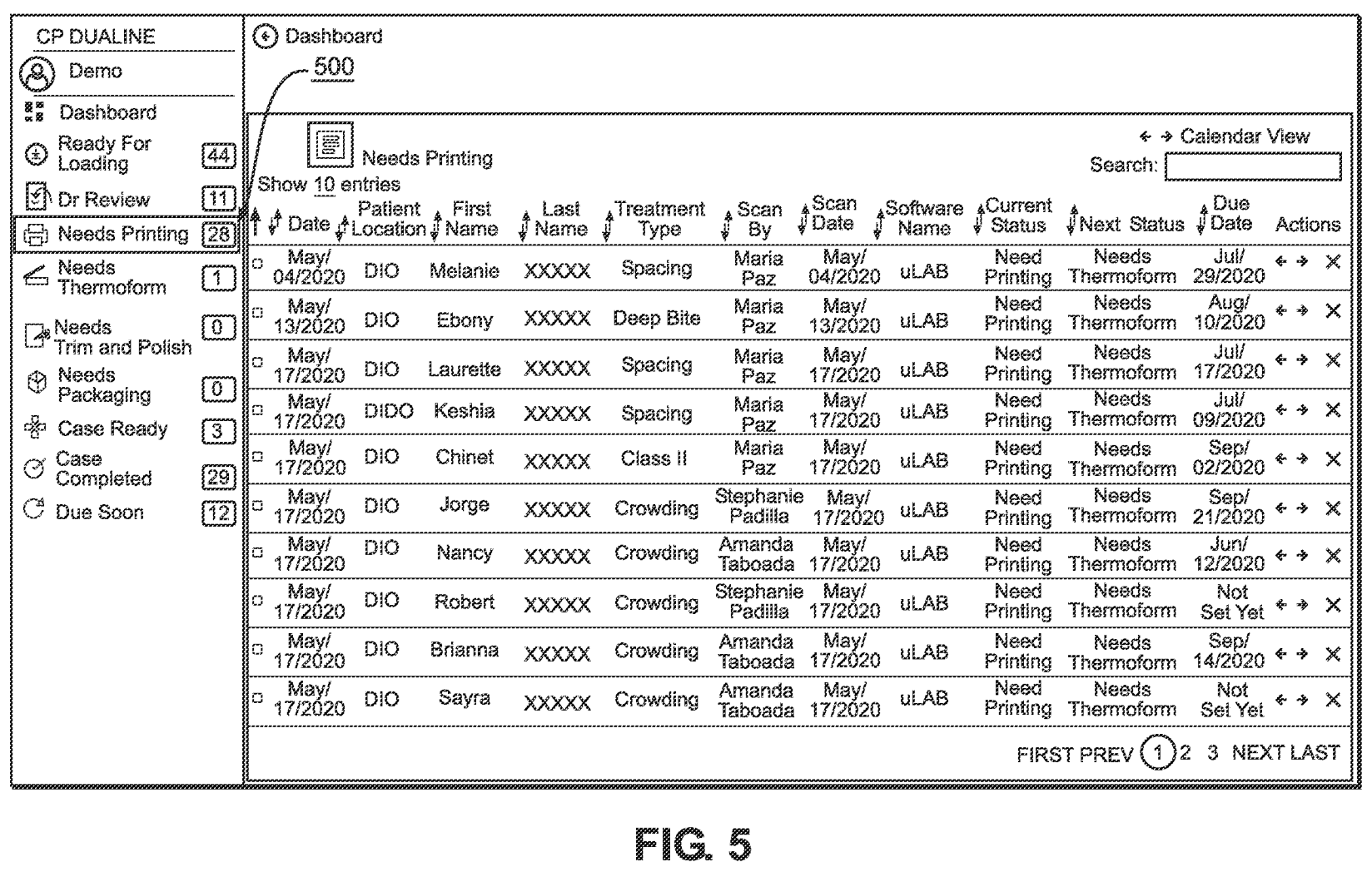

FIG. 5 illustrates a graphical user interface showing needs printing status 500 for tracking dental aligner production and manufacture for the plurality of patients after a user selects a subject heading of needs printing of FIG. 2, in accordance with various embodiments of the present technology. The needs printing status 500 for tracking dental aligner production and manufacture for the plurality of patients may be displayed after a user selects the subject heading needs printing of FIG. 2. For example, the graphical user interface for the tracking dental aligner production and manufacture for the plurality of patients of FIG. 5 displays a third row of cells containing a third subject heading displaying a printing status, the printing status being a status of the printing, using the three-dimensional (3D) printer, the series of dental models matching the series of modified teeth positions. For instance, the needs printing status 500 for tracking dental aligner production and manufacture indicates a status of the printing, using the three-dimensional (3D) printer, the series of dental models matching the series of modified teeth positions. For instance, a status of operation 140 of FIG. 1, printing, using a three-dimensional (3D) printer, a series of dental models matching the series of modified teeth positions from the starting teeth positions, the series of dental models being used for fabricating a series of dental aligners that cause the starting teeth positions of the patient to physically change to the desired teeth positions.

Figure 6:
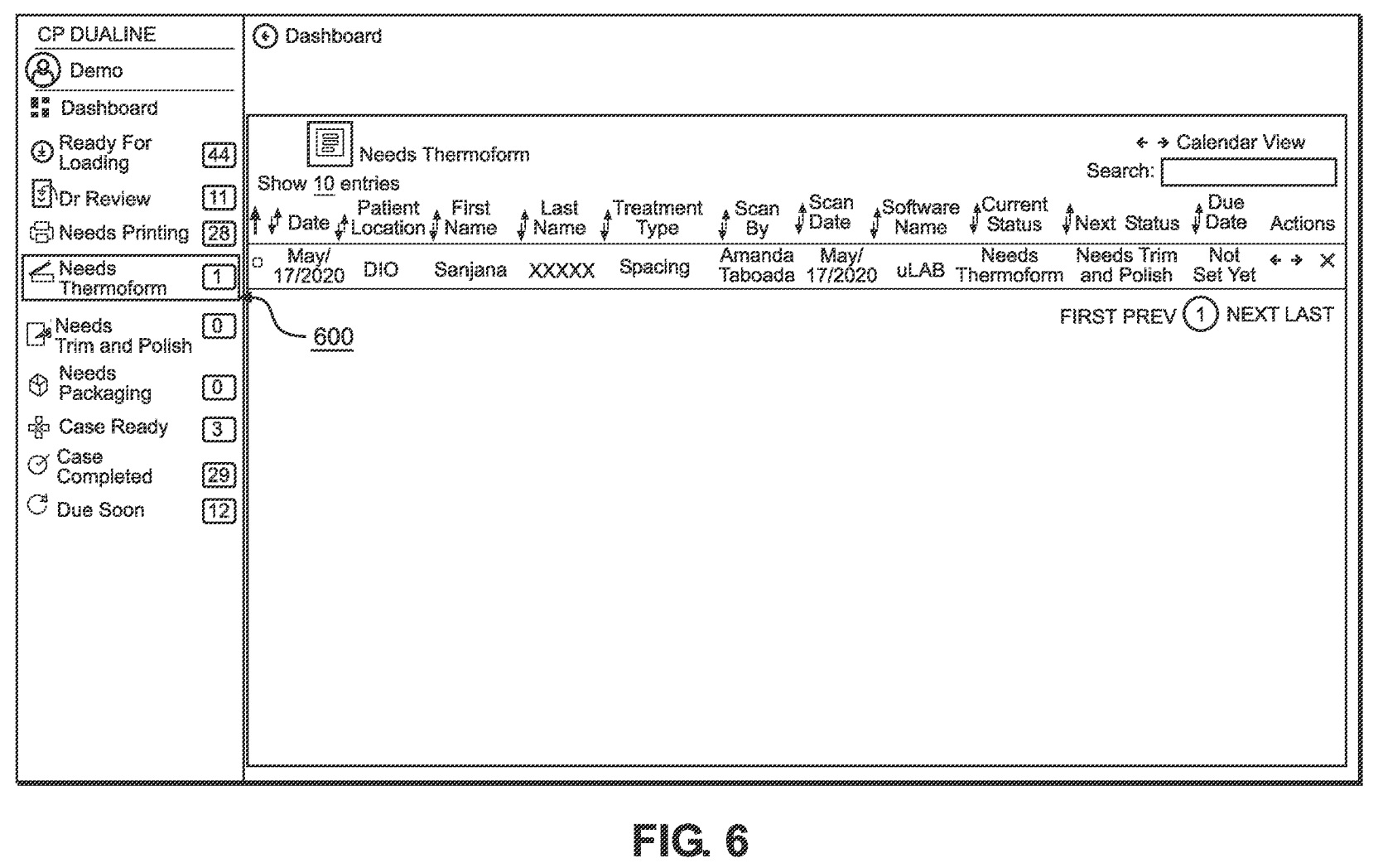

FIG. 6 illustrates a graphical user interface showing needs thermoform status 600 for tracking dental aligner production and manufacture for the plurality of patients after a user selects a subject heading of needs thermoform of FIG. 2, in accordance with various embodiments of the present technology. The needs thermoform status 600 for tracking dental aligner production and manufacture for the plurality of patients may be displayed after a user selects the subject heading of needs thermoform status of FIG. 2. For example, the graphical user interface for the tracking dental aligner production and manufacture for the plurality of patients of FIG. 6 displays a fourth row of cells containing a fourth subject heading displaying a thermoform status, the thermoform status being a status of thermoforming a dental aligner of the series of dental aligners matching the series of modified teeth positions. For instance, the needs thermoform status 600 for tracking dental aligner production and manufacture indicates a status of thermoforming dental aligners for a plurality of patients as shown in FIG. 6.

FIG. 7 illustrates a graphical user interface showing needs trim and polish status 700 for tracking dental aligner production and manufacture for the plurality of patients after a user selects a subject heading needs trim and polish of FIG. 2, in accordance with various embodiments of the present technology. The needs trim and polish status 700 for tracking dental aligner production and manufacture for the plurality of patients may be displayed after a user selects the subject heading of needs trim and polish status of FIG. 2. For example, the graphical user interface for the tracking dental aligner production and manufacture for the plurality of patients of FIG. 7 displays a fifth row of cells containing a fifth subject heading displaying a trim and polish status, the trim and polish status being a status of trimming and polishing of the dental aligner of the series of dental aligners matching the series of modified teeth positions. For instance, the needs trim and polish status 700 for tracking dental aligner production and manufacture indicates a status of trimming and polishing of the dental aligner of the series of dental aligners for the plurality of patients as shown in FIG. 7.

Figure 8:
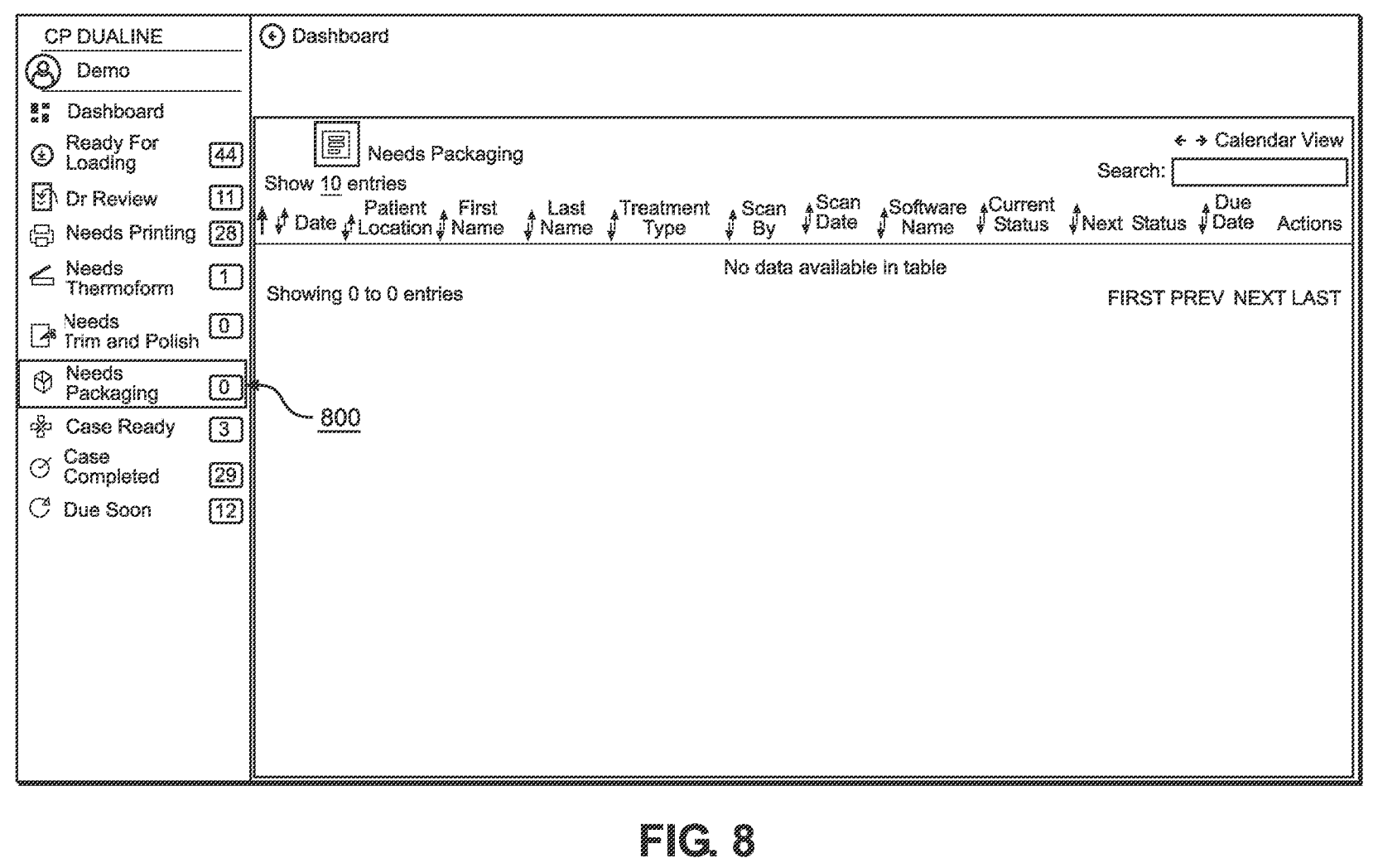

FIG. 8 illustrates a graphical user interface showing needs packaging status 800 for tracking dental aligner production and manufacture for the plurality of patients after a user selects a subject heading needs packaging of FIG. 2, in accordance with various embodiments of the present technology. The needs packaging status 800 for tracking dental aligner production and manufacture for the plurality of patients may be displayed after a user selects the subject heading of needs packaging status of FIG. 2. For example, the graphical user interface for the tracking dental aligner production and manufacture for the plurality of patients of FIG. 8 displays a sixth row of cells containing a sixth subject heading displaying a packaging status, the packaging status being a status of packaging of the dental aligner of the series of dental aligners matching the series of modified teeth positions. For instance, the needs packaging status 800 for tracking dental aligner production and manufacture indicates a status of packaging of the dental aligner of the series of dental aligners matching the series of modified teeth positions as shown in FIG. 8.

Figure 9:
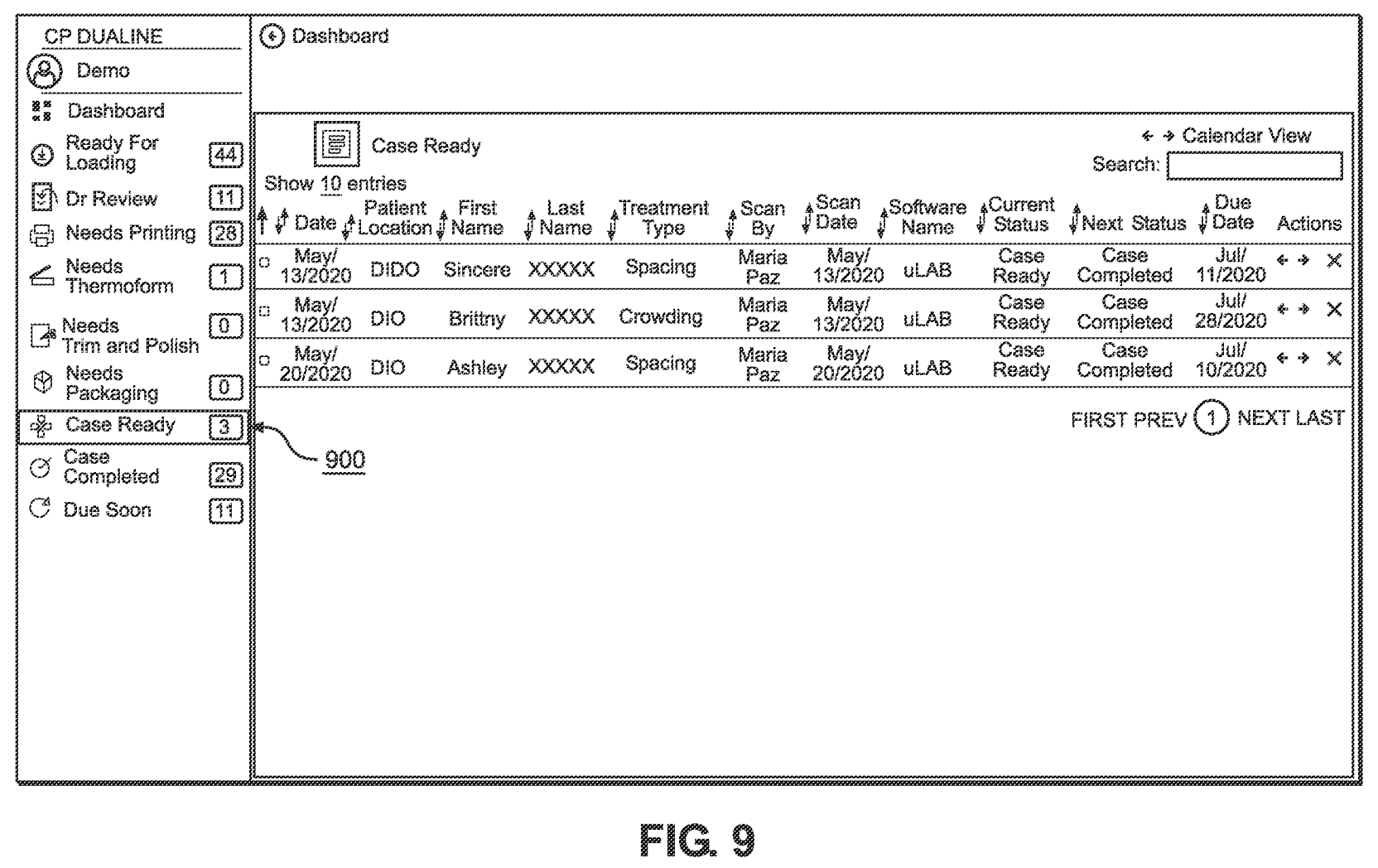

FIG. 9 illustrates a graphical user interface showing case ready status 900 for tracking dental aligner production and manufacture for the plurality of patients after a user selects a subject heading case ready of FIG. 2, in accordance with various embodiments of the present technology. The case ready status 900 for tracking dental aligner production and manufacture for the plurality of patients may be displayed after a user selects the subject heading of ready for loading status of FIG. 2. For example, the graphical user interface for the tracking dental aligner production and manufacture for the plurality of patients of FIG. 9 displays a seventh row of cells containing a seventh subject heading displaying a case ready status, the case ready status being a status of completion of the dental aligner of the series of dental aligners matching the series of modified teeth positions. For instance, the case ready status 900 for tracking dental aligner production and manufacture indicates a status of completion of the dental aligner of the series of dental aligners matching the series of modified teeth positions as shown in FIG. 9.

FIG. 10 illustrates a graphical user interface showing case completed status 1000 for tracking dental aligner production and manufacture for the plurality of patients after a user selects a subject heading case completed of FIG. 2, in accordance with various embodiments of the present technology. The case completed status 1000 for tracking dental aligner production and manufacture for the plurality of patients may be displayed after a user selects the subject heading of case completed status of FIG. 2. For example, the graphical user interface for the tracking dental aligner production and manufacture for the plurality of patients of FIG. 10 comprises an eight row of cells containing an eighth subject heading displaying a case completed status, the case completed status being a status of completion of all aligners of the series of dental aligners matching the series of modified teeth positions. For instance, the case completed status 1000 for tracking dental aligner production and manufacture indicates a status of completion of all the steps of dental aligner production and manufacture for the plurality of patients as shown in FIG. 10.

FIG. 11 illustrates a graphical user interface showing due soon status 1100 for tracking dental aligner production and manufacture for the plurality of patients after a user selects a subject heading due soon of FIG. 2, in accordance with various embodiments of the present technology. For instance, the due soon status 1100 for tracking dental aligner production and manufacture indicates any of the steps of dental aligner production and manufacture for the plurality of patients that are due soon as shown in FIG. 11. For example, an orthodontist may be able to avoid missing any due dates for patients by using the due soon status 1100 for tracking dental aligner production and manufacture for the plurality of patients.

Figure 12:
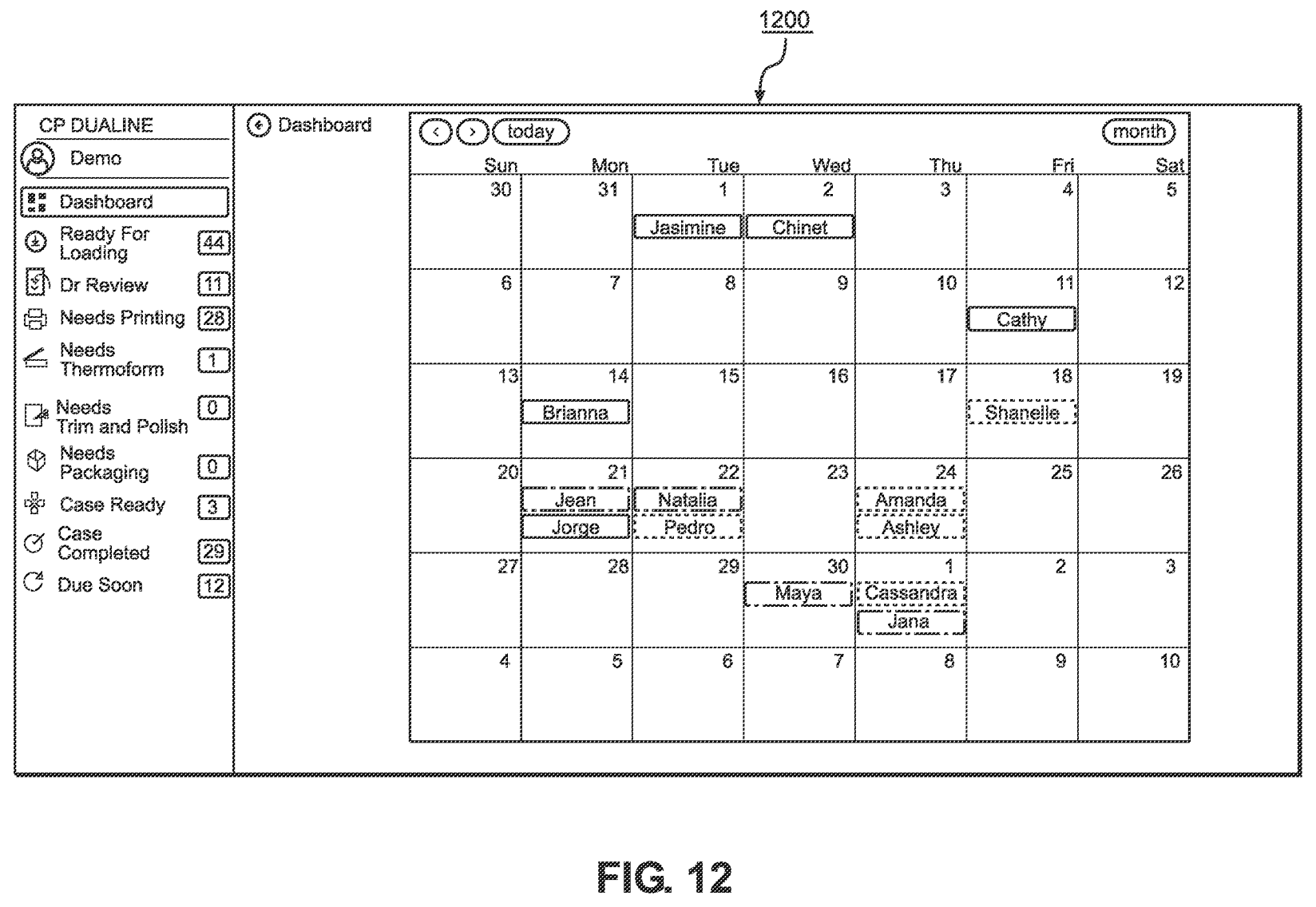

FIG. 12 illustrates a graphical user interface showing a calendar view 1200 for tracking dental aligner production and manufacture for the plurality of patients after a user selects a subject heading calendar view of FIG. 2, in accordance with various embodiments of the present technology. For instance, the calendar view 1200 for tracking dental aligner production and manufacture displays the steps of dental aligner production and manufacture for the plurality of patients on a calendar for easy tracking and also show shows deadlines that are due soon as shown in FIG. 12. For example, an orthodontist may be able to avoid missing any deadlines for when patients are scheduled to be in the office by using the calendar view 1200 for tracking dental aligner production and manufacture for the plurality of patients.

Figure 13:
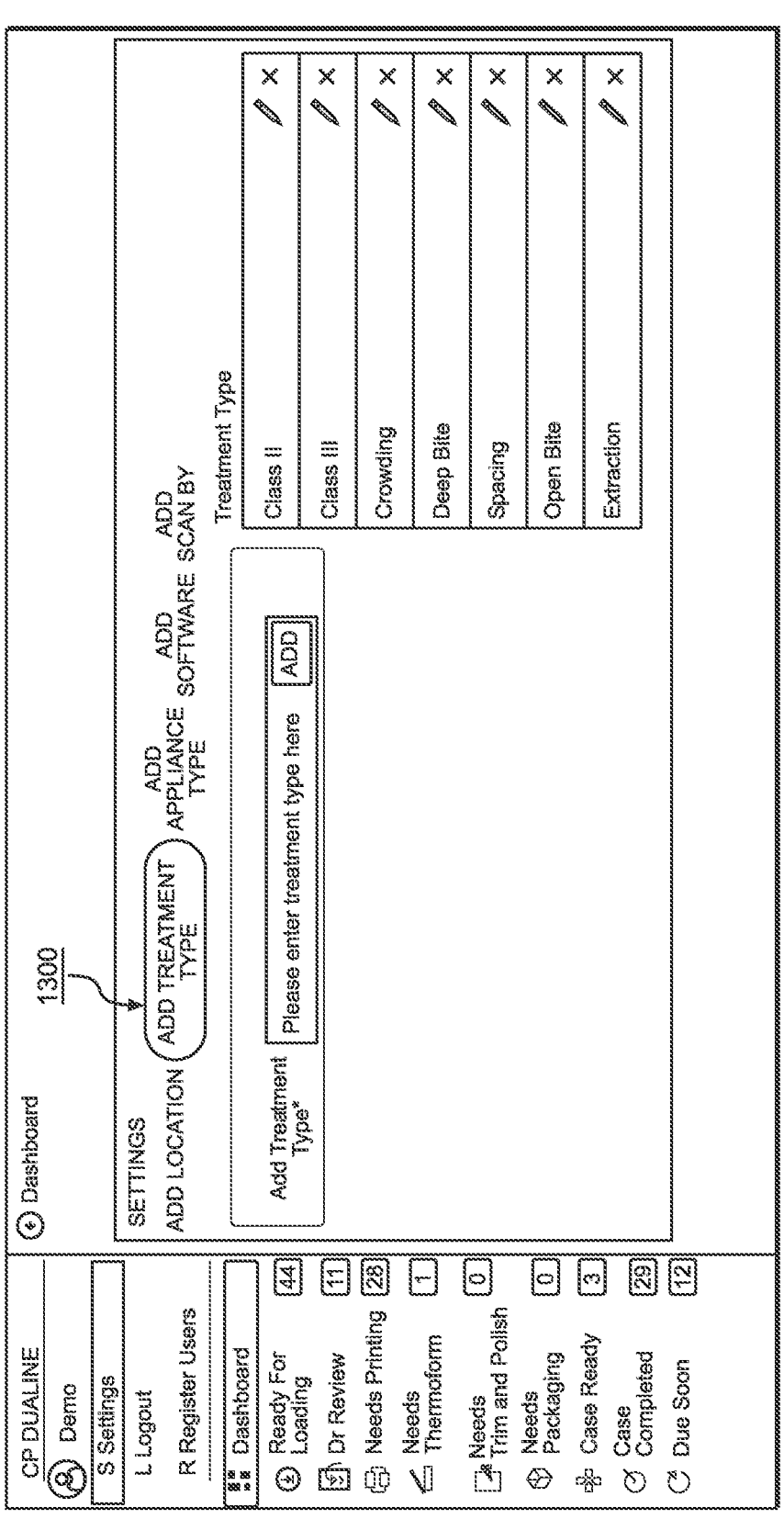
FIG. 13 illustrates a graphical user interface showing an add treatment type for tracking dental aligner production and manufacture for the plurality of patients after a user selects a subject heading add treatment type under settings of FIG. 2, in accordance with various embodiments of the present technology.

FIG. 13 illustrates a graphical user interface showing an add treatment type 1300 for tracking dental aligner production and manufacture for the plurality of patients after a user selects a subject heading add treatment type under settings of FIG. 2, in accordance with various embodiments of the present technology. For instance, the add treatment type 1300 for tracking dental aligner production and manufacture indicates a data field to add a type of treatment for a patient such as overcrowding, gapped teeth, overbites, underbites, crossbites, and open bites, extraction, and the like. For example, an orthodontist may be able to add a treatment type such as overcrowding, gapped teeth, overbites, underbites, crossbites, and open bites, extraction, and the like, to a patient case for tracking dental aligner production and manufacture for the plurality of patients.

Figure 14:
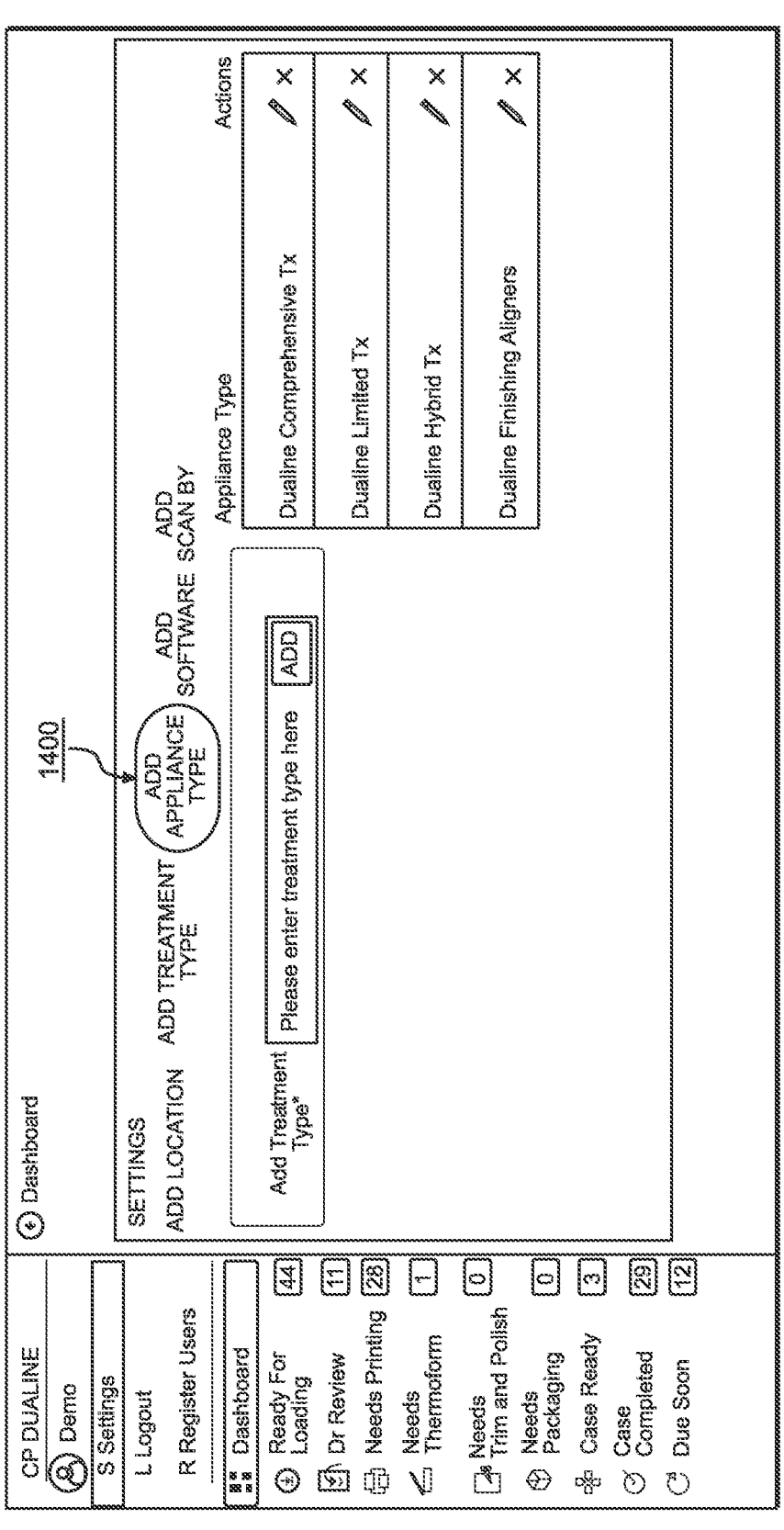
FIG. 14 illustrates a graphical user interface showing an add appliance type for tracking dental aligner production and manufacture for the plurality of patients after a user selects an add appliance type under settings of FIG. 2, in accordance with various embodiments of the present technology.

FIG. 14 illustrates a graphical user interface showing an add appliance type 1400 for tracking dental aligner production and manufacture for the plurality of patients after a user selects an add appliance type under settings of FIG. 2, in accordance with various embodiments of the present technology. For instance, the add appliance type 1400 for tracking dental aligner production and manufacture indicates a data field to add appliance type for a patient such as comprehensive, limited, hybrid, and finishing aligners, and the like. For example, an orthodontist may be able to add an appliance type to a patient record type such comprehensive, limited, hybrid, and finishing aligners, and the like, for tracking dental aligner production and manufacture for the plurality of patients.

Figure 15:
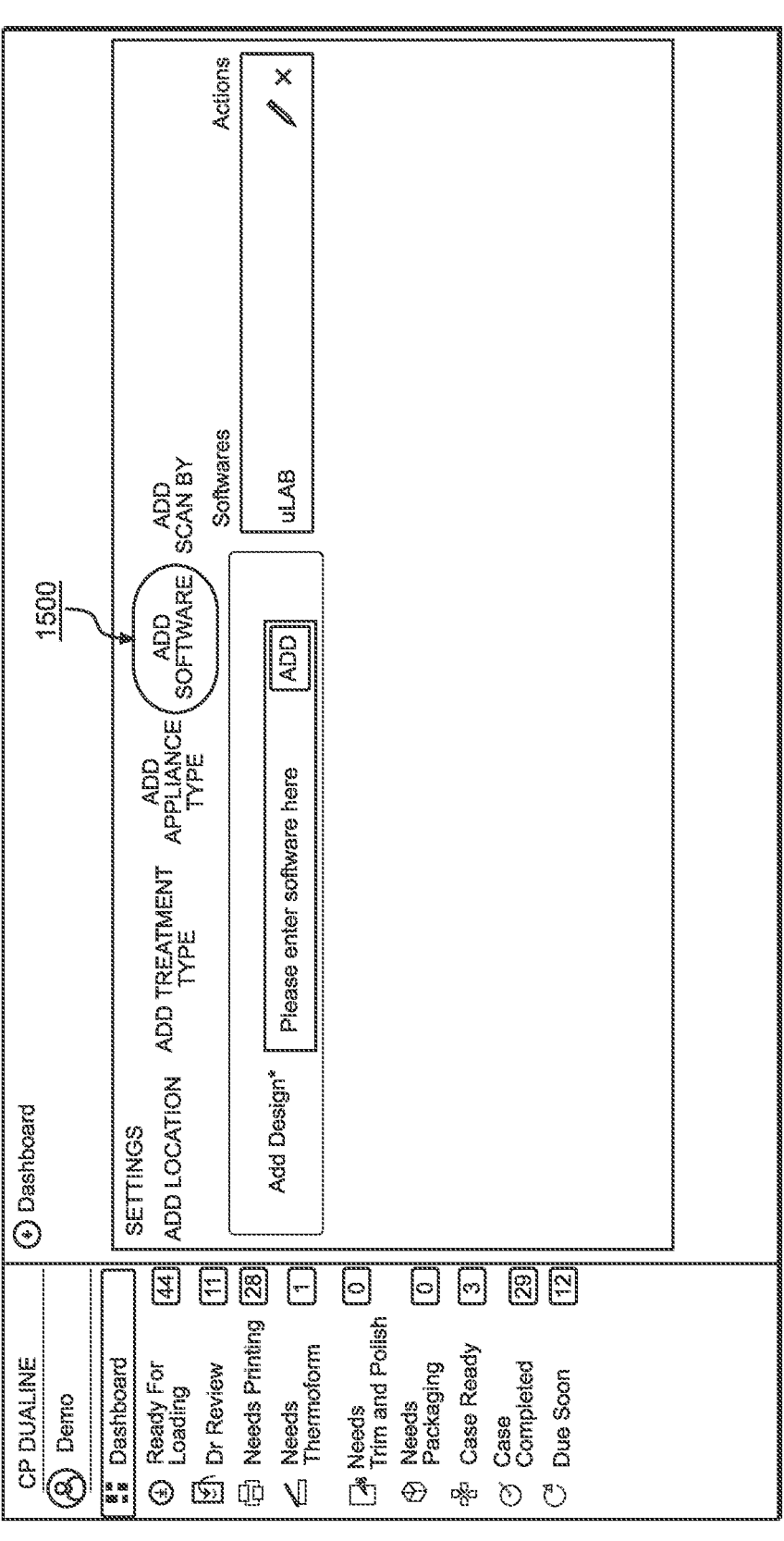
FIG. 15 illustrates a graphical user interface showing an add software for tracking dental aligner production and manufacture for the plurality of patients after a user selects add software under settings of FIG. 2, in accordance with various embodiments of the present technology.

FIG. 15 illustrates a graphical user interface showing an add software 1500 for tracking dental aligner production and manufacture for the plurality of patients after a user selects add software under settings of FIG. 2, in accordance with various embodiments of the present technology. For instance, the add software 1500 for tracking dental aligner production and manufacture indicates a data field to add a type of software used with the tracking dental aligner production and manufacture.

Figure 16:
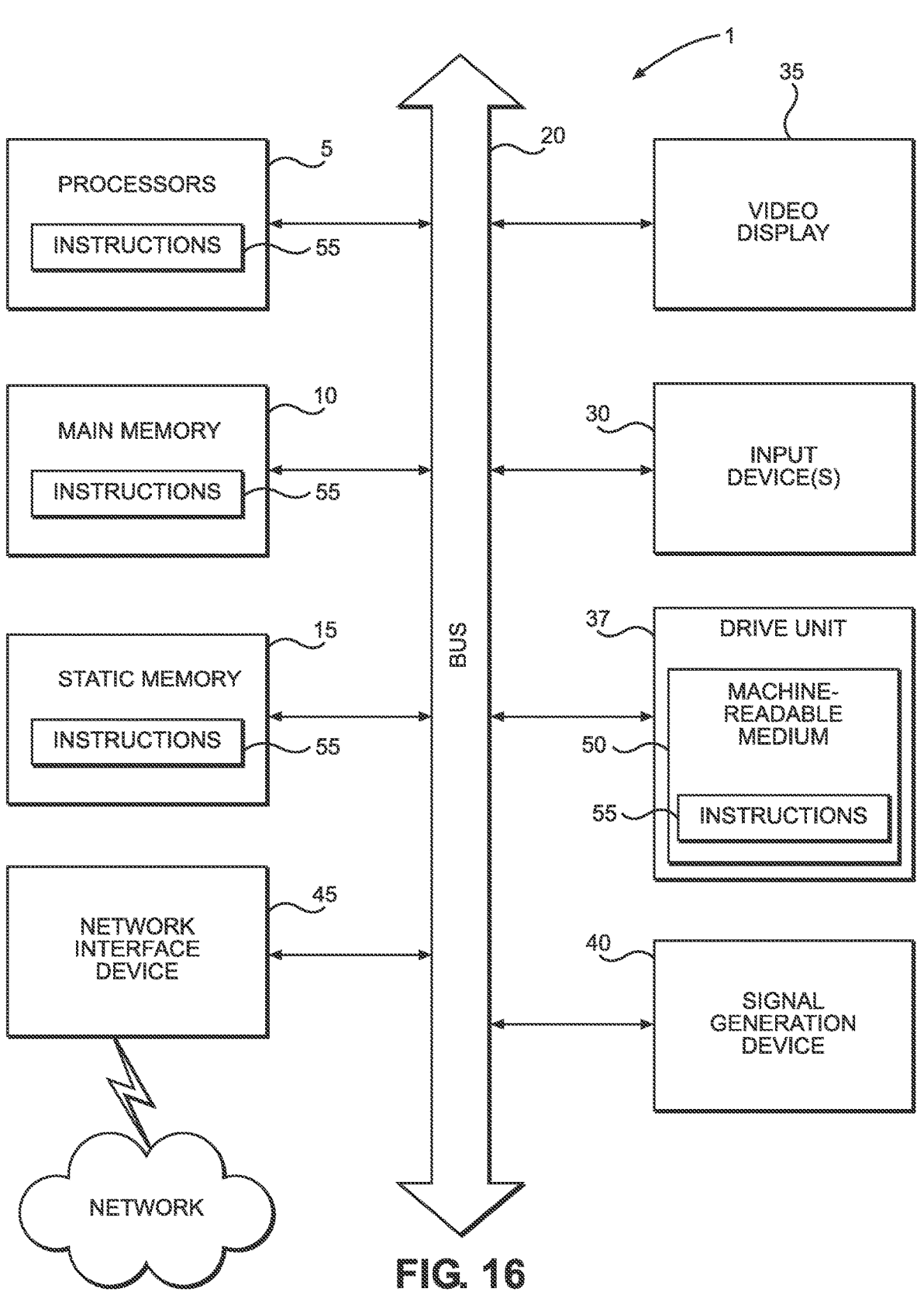
FIG. 16 illustrates an exemplary computer system that may be used to implement embodiments of the present technology according to various embodiments.

FIG. 16 illustrates an exemplary computer system that may be used to implement embodiments of the present technology according to various embodiments. FIG. 16 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In various embodiments, the present technology enables a capability to track multiple treatment modalities for a plurality of patients. For example, treatment modalities for a patient may include but are not limited to custom braces, retainers, digital communication applications, and commercial clear aligner communications from companies, in addition to in-house aligner fabrication tracking. Commercial clear aligner companies may be referred to as "digital companies" hereinafter.

In some embodiments, the present technology enables tracking different patient dental treatment modalities for a plurality of patients as well as the ability to be a centralized digital workflow platform for managing and tracking treatment of patients. For example, included in the centralized digital workflow platform (e.g., CAStrack) of the present technology is an ability to load records such as, but not limited to, intra-oral and extra-oral photographs, digital scans/models, radiographs, treatment plans, and any documents pertaining to a patient's records. In turn, those patient records may be used to submit/initiate treatment with corresponding digital companies from within the centralized digital workflow platform (e.g., CAStrack) of the present technology. The present technology enables bilateral real-time syncing integration between a centralized digital workflow platform and the digital companies.

In various embodiments, an example method for chronologically tracking patient dental treatment modalities for a plurality of patients including dental aligner production and manufacture, the method comprising the following steps, receiving an intra-oral scan including starting teeth positions of a patient and a date of the intra-oral scan; receiving a treatment plan including desired teeth positions of the patient based on the intra-oral scan; generating a series of modified teeth positions from the starting teeth positions based on the treatment plan, the series of modified teeth positions from the starting teeth positions being incremental changes from the starting teeth positions to the desired teeth positions; displaying a three-dimensional model of the series of the modified teeth positions from the starting teeth positions, the three-dimensional model being used to fabricate a dental device that causes the starting teeth positions of the patient to physically change to the desired teeth positions according to the treatment plan; displaying a graphical user interface for the chronologically tracking patient dental treatment modalities for the plurality of patients, the graphical user interface for the chronologically tracking patient dental treatment modalities for the plurality of patients comprising: a first row of cells containing a first subject heading displaying pending review status, the pending review being a status of doctor evaluation of the treatment plan for the patient dental treatment modalities including the desired teeth positions of the patient based on the intra-oral scan, a second row of cells containing a second subject heading displaying manufacturing status, the manufacturing status being a status of manufacturing of the dental, the dental device causing the series of modified teeth positions from the starting teeth positions and causing the incremental changes from the starting teeth positions to the desired teeth positions; and a third row of cells containing a third subject heading displaying a shipping status, the shipping status being a status of shipping of the dental device based on the dental treatment modalities.

Figure 17:
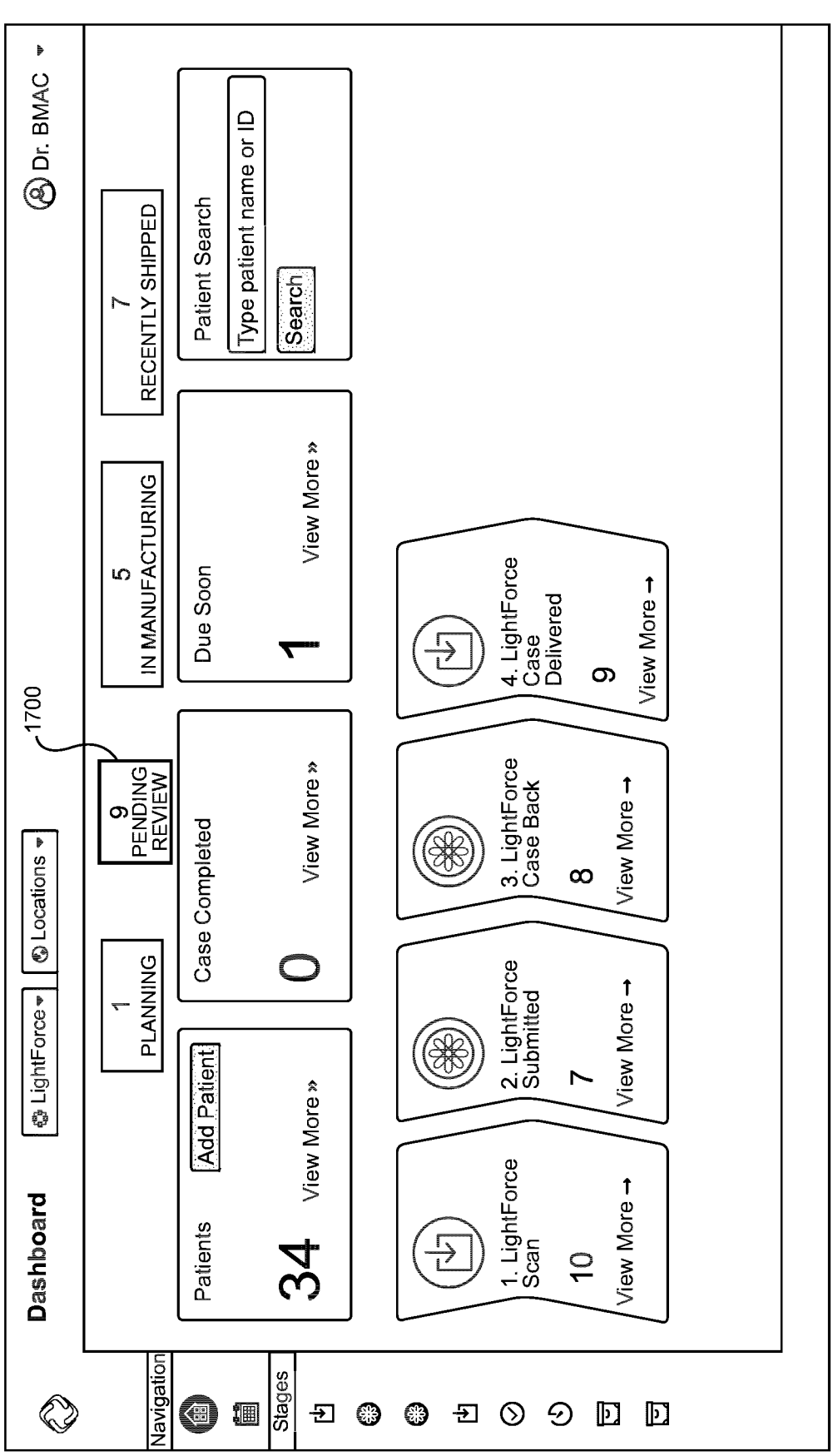
FIG. 17 illustrates a graphical user interface for chronologically tracking patient dental treatment modalities for a plurality of patients including dental aligner production and manufacture showing a first row of cells containing a first subject heading displaying pending review status, in accordance with various embodiments of the present technology.

FIG. 17 illustrates a graphical user interface for chronologically tracking patient dental treatment modalities for a plurality of patients including dental aligner production and manufacture showing a first row of cells containing a first subject heading displaying pending review status 1700, in accordance with various embodiments of the present technology. For example, methods may include displaying a graphical user interface for the chronologically tracking patient dental treatment modalities for the plurality of patients, the graphical user interface for the chronologically tracking patient dental treatment modalities for the plurality of patients comprising: a first row of cells containing a first subject heading displaying pending review status 1700, the pending review being a status of doctor evaluation of the treatment plan for the patient dental treatment modalities including the desired teeth positions of the patient based on the intra-oral scan;

FIG. 18 illustrates a graphical user interface for chronologically tracking patient dental treatment modalities for a plurality of patients after a user selects a subject heading of pending review 1800 of FIG. 17, in accordance with various embodiments of the present technology.

Figure 19:
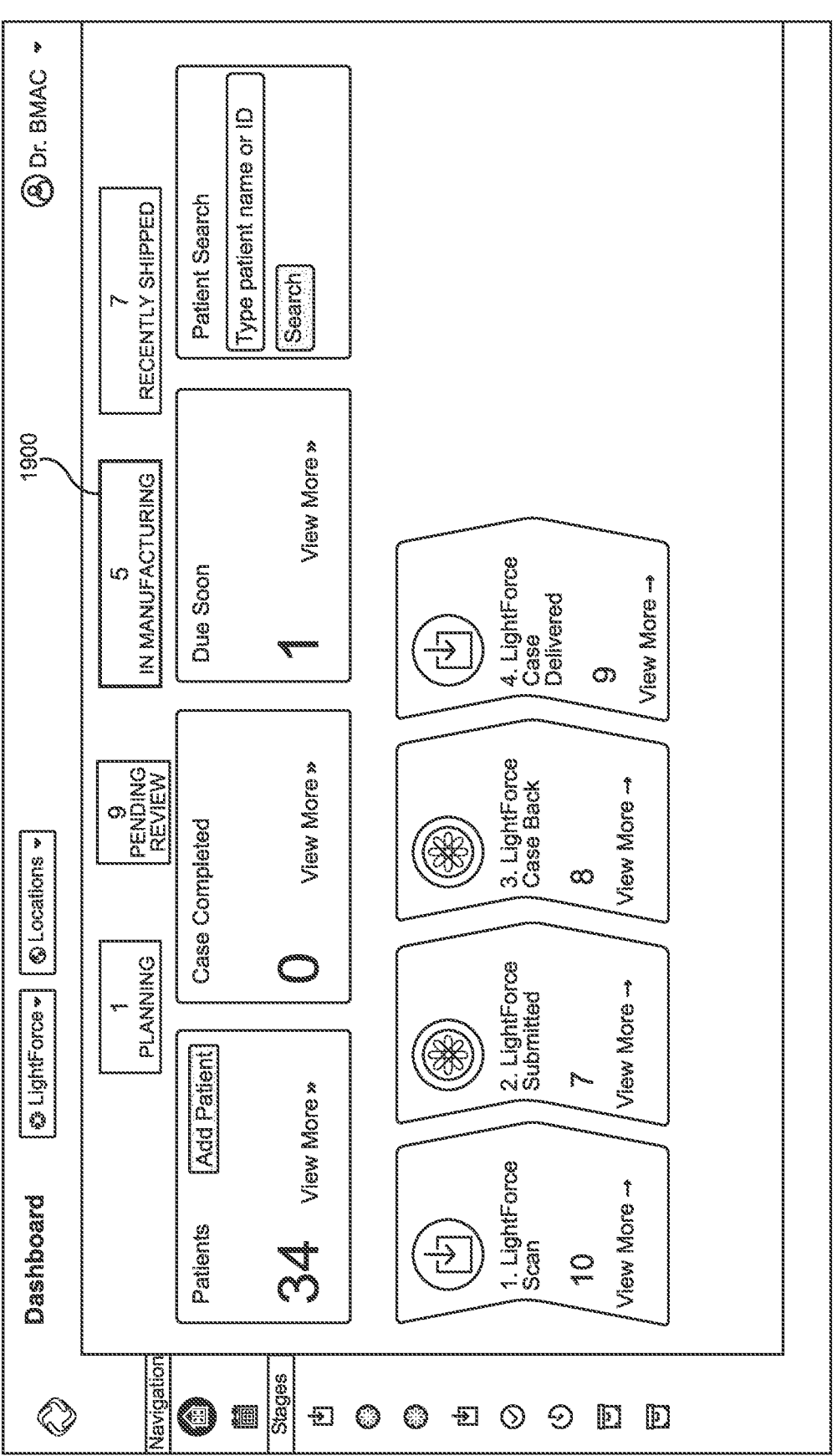
FIG. 19 illustrates a graphical user interface for chronologically tracking patient dental treatment modalities for a plurality of patients including dental aligner production and manufacture showing a second row of cells containing a second subject heading displaying manufacturing status, in accordance with various embodiments of the present technology.

FIG. 19 illustrates a graphical user interface for chronologically tracking patient dental treatment modalities for a plurality of patients including dental aligner production and manufacture showing a second row of cells containing a second subject heading displaying manufacturing status 1900, in accordance with various embodiments of the present technology. For example, methods may include displaying a graphical user interface for the chronologically tracking patient dental treatment modalities for the plurality of patients, the graphical user interface for the chronologically tracking patient dental treatment modalities for the plurality of patients comprising: a second row of cells containing a second subject heading displaying manufacturing status 1900, the manufacturing status being a status of manufacturing of the dental, the dental device causing the series of modified teeth positions from the starting teeth positions and causing the incremental changes from the starting teeth positions to the desired teeth positions.

Figure 20:
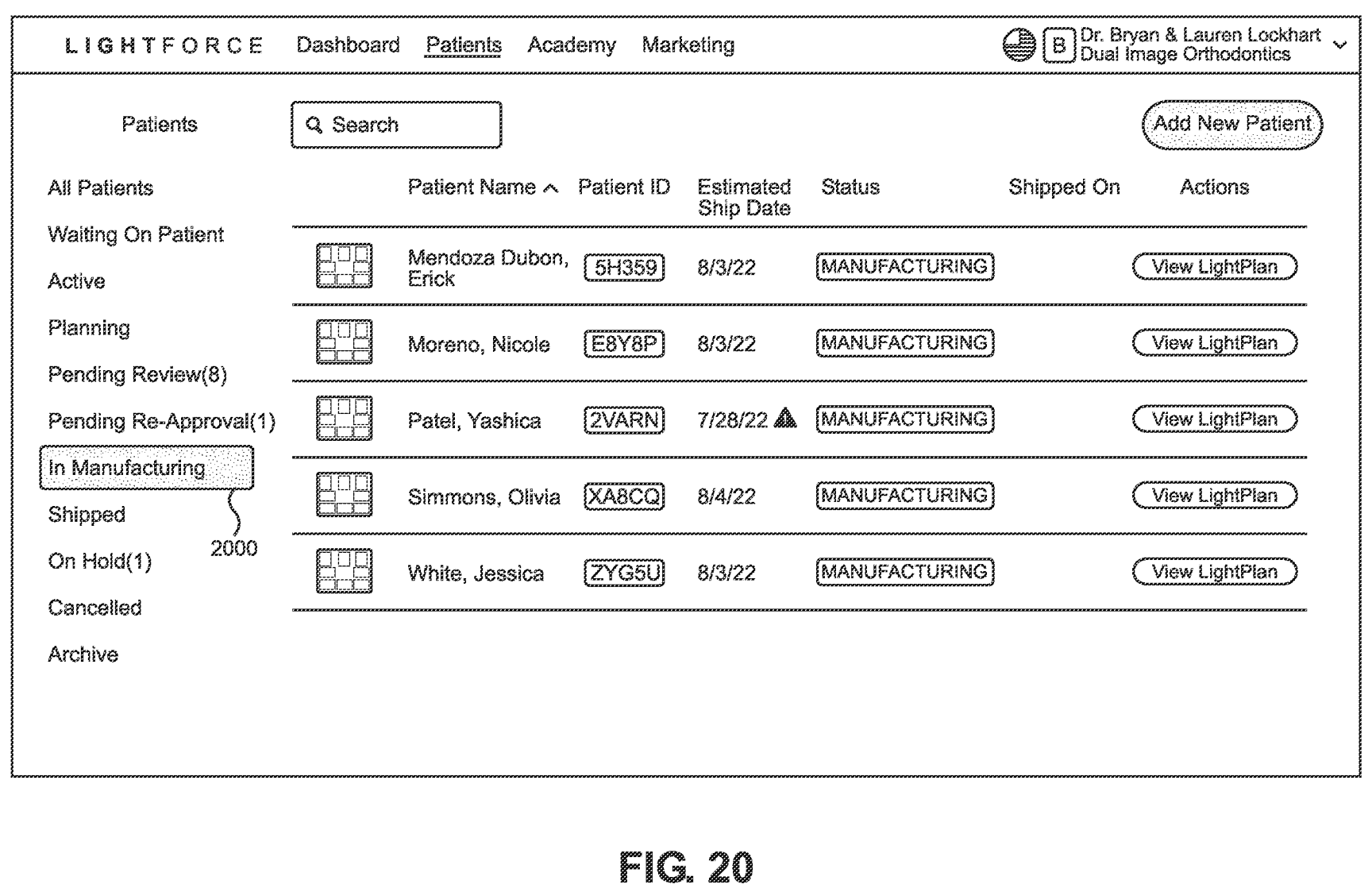

FIG. 20 illustrates a graphical user interface for chronologically tracking patient dental treatment modalities for a plurality of patients after a user selects a subject heading of manufacturing status 2000 of FIG. 19, in accordance with various embodiments of the present technology.

Figure 21:
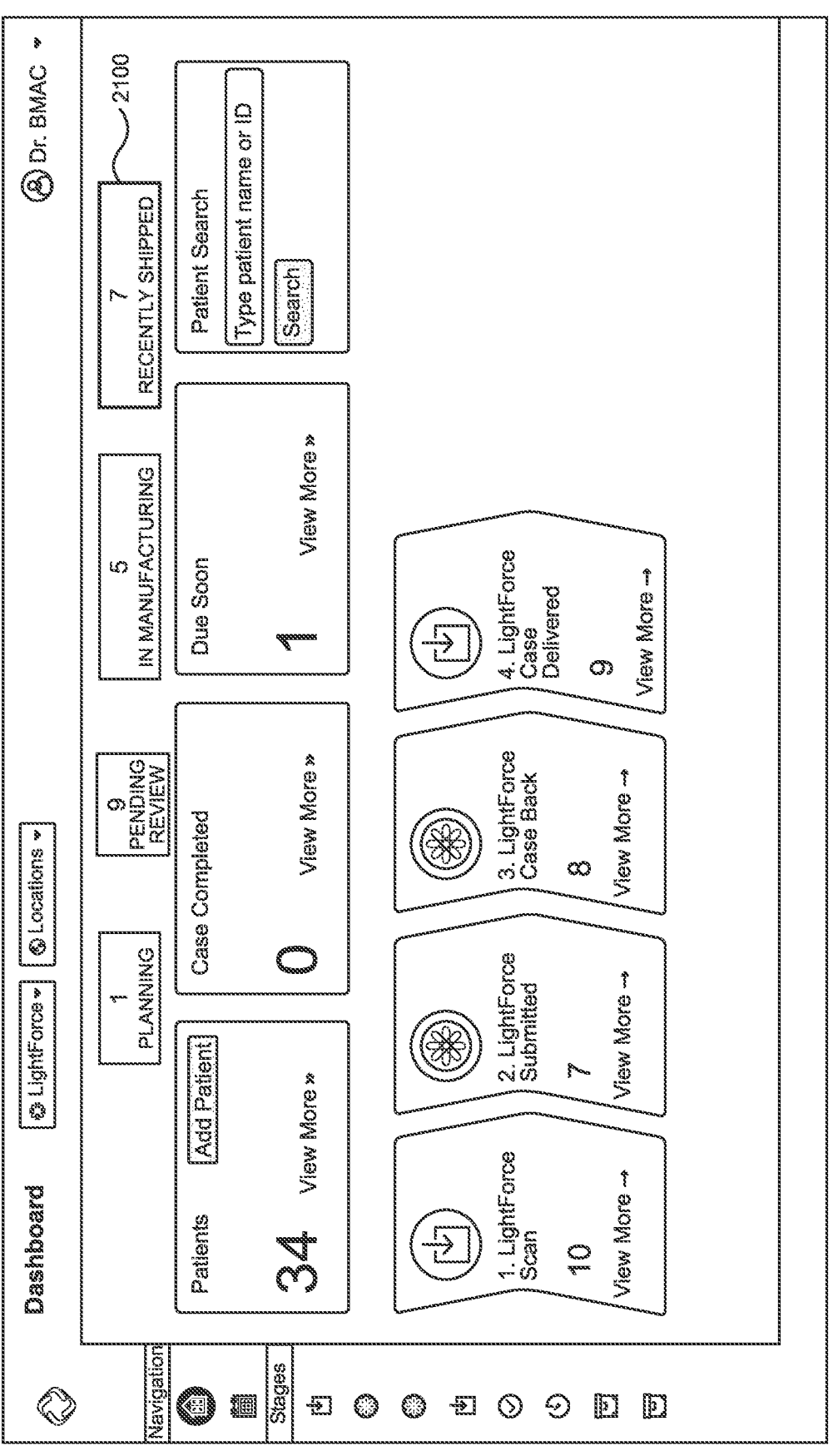
FIG. 21 illustrates a graphical user interface for chronologically tracking patient dental treatment modalities for a plurality of patients including dental aligner production and manufacture showing a third row of cells containing a third subject heading displaying a shipping status, in accordance with various embodiments of the present technology.

FIG. 21 illustrates a graphical user interface for chronologically tracking patient dental treatment modalities for a plurality of patients including dental aligner production and manufacture showing a third row of cells containing a third subject heading displaying a shipping status 2100, in accordance with various embodiments of the present technology. For example, methods may include displaying a graphical user interface for the chronologically tracking patient dental treatment modalities for the plurality of patients, the graphical user interface for the chronologically tracking patient dental treatment modalities for the plurality of patients comprising: a third row of cells containing a third subject heading displaying a shipping status 2100, the shipping status being a status of shipping of the dental device based on the dental treatment modalities.

FIG. 22 illustrates a graphical user interface for chronologically tracking patient dental treatment modalities for a plurality of patients after a user selects a subject heading of shipping status 2200 of FIG. 21, in accordance with various embodiments of the present technology.

Figure 23:
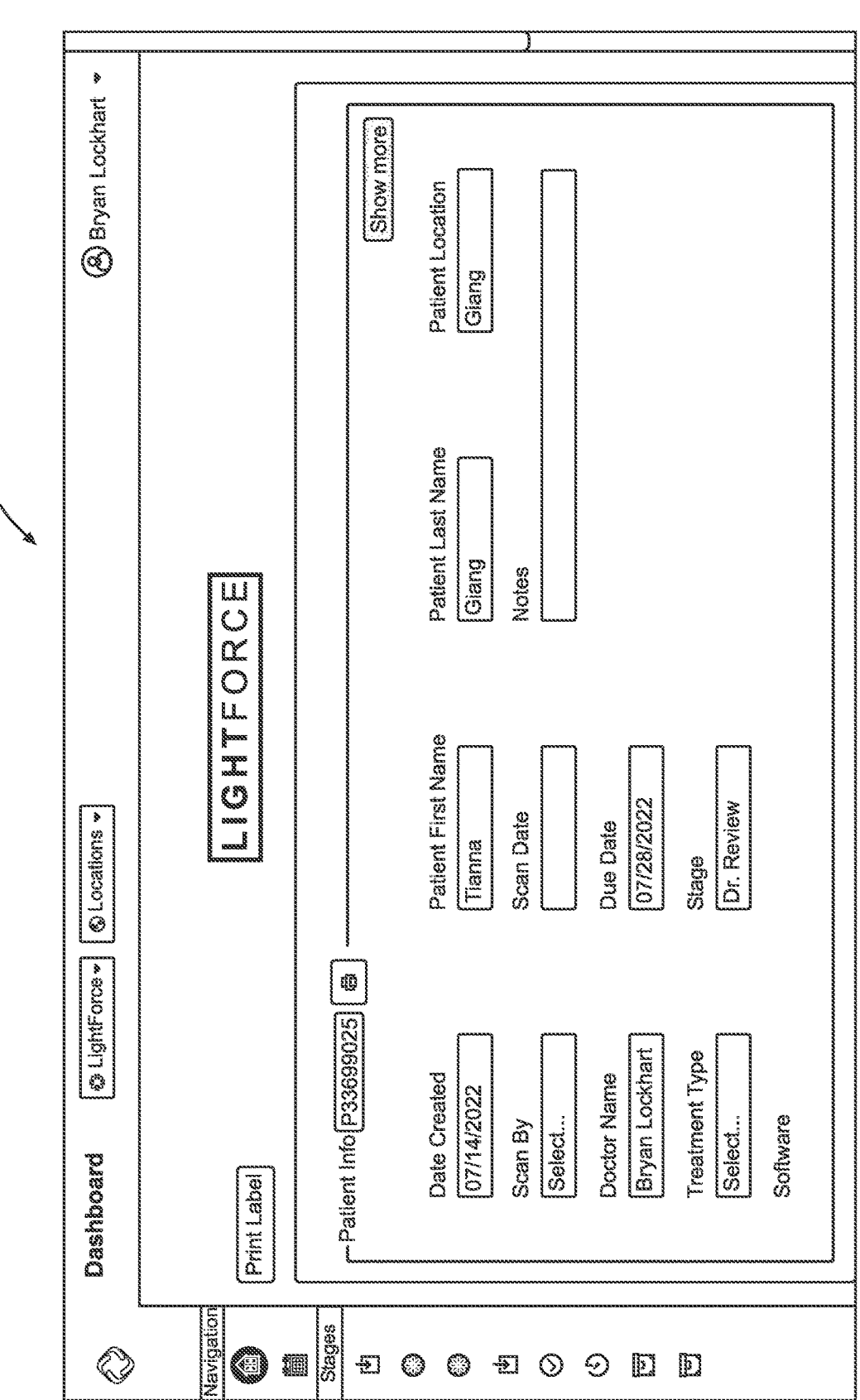
FIG. 23 illustrates a graphical user interface for chronologically tracking patient dental treatment modalities for a plurality of patients including dental aligner production and manufacture showing entering patient data, in accordance with various embodiments of the present technology.

FIG. 23 illustrates a graphical user interface for chronologically tracking patient dental treatment modalities for a plurality of patients including dental aligner production and manufacture showing entering patient data 2300, in accordance with various embodiments of the present technology.

Figure 24:
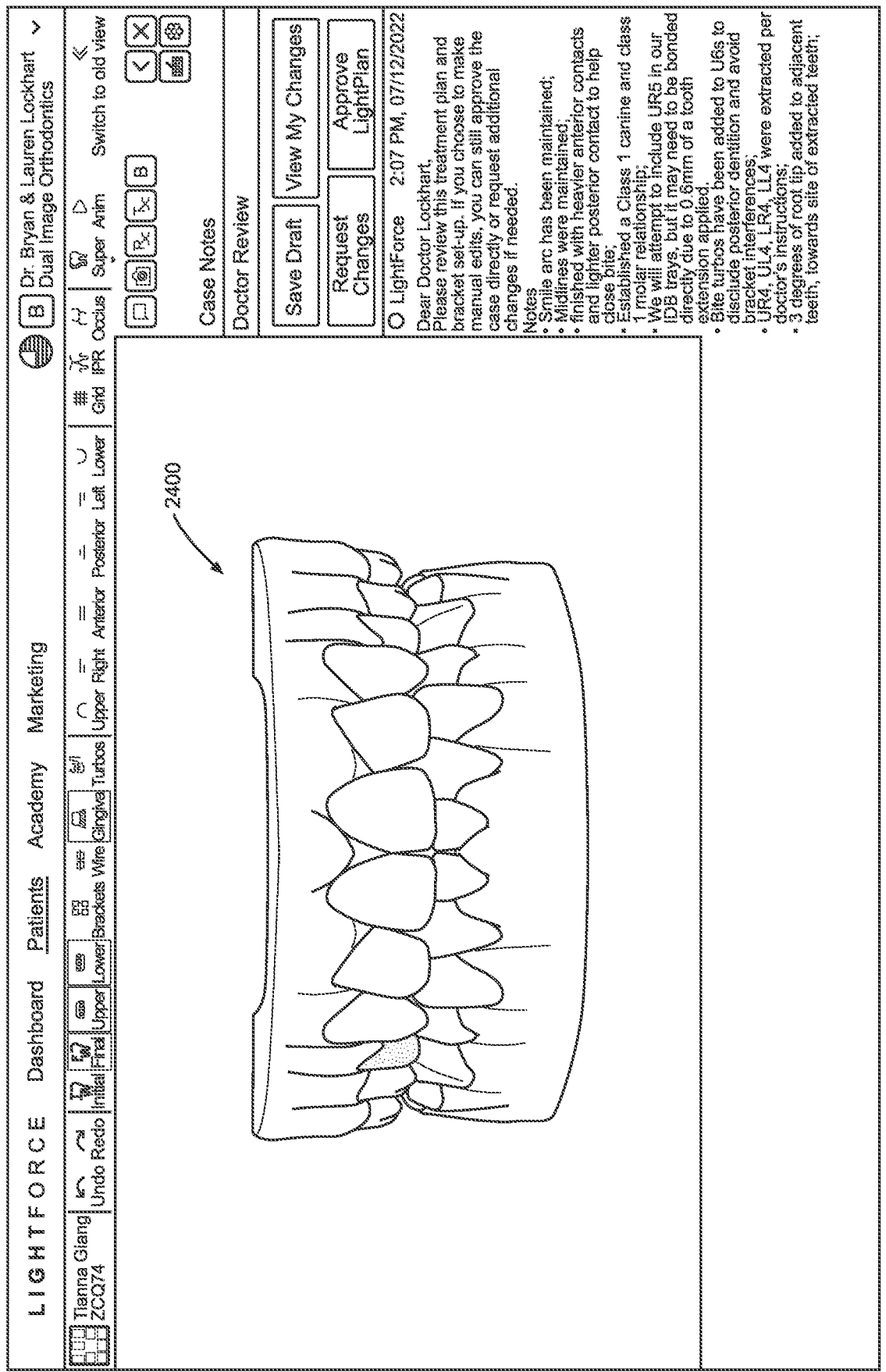
FIG. 24 illustrates a graphical user interface for chronologically tracking patient dental treatment modalities for a plurality of patients displaying a three-dimensional model of the series of the modified teeth positions from the starting teeth positions, in accordance with various embodiments of the present technology.

FIG. 24 illustrates a graphical user interface for chronologically tracking patient dental treatment modalities for a plurality of patients displaying a three-dimensional model 2400 of the series of the modified teeth positions from the starting teeth positions, in accordance with various embodiments of the present technology. For example, methods may include displaying a graphical user interface for the chronologically tracking patient dental treatment modalities for the plurality of patients, the graphical user interface for the chronologically tracking patient dental treatment modalities for the plurality of patients comprising: displaying a three-dimensional model 2400 of the series of the modified teeth positions from the starting teeth positions, the three-dimensional model 2400 being used to fabricate a dental device that causes the starting teeth positions of the patient to physically change to the desired teeth positions according to the treatment plan.

Figure 25:
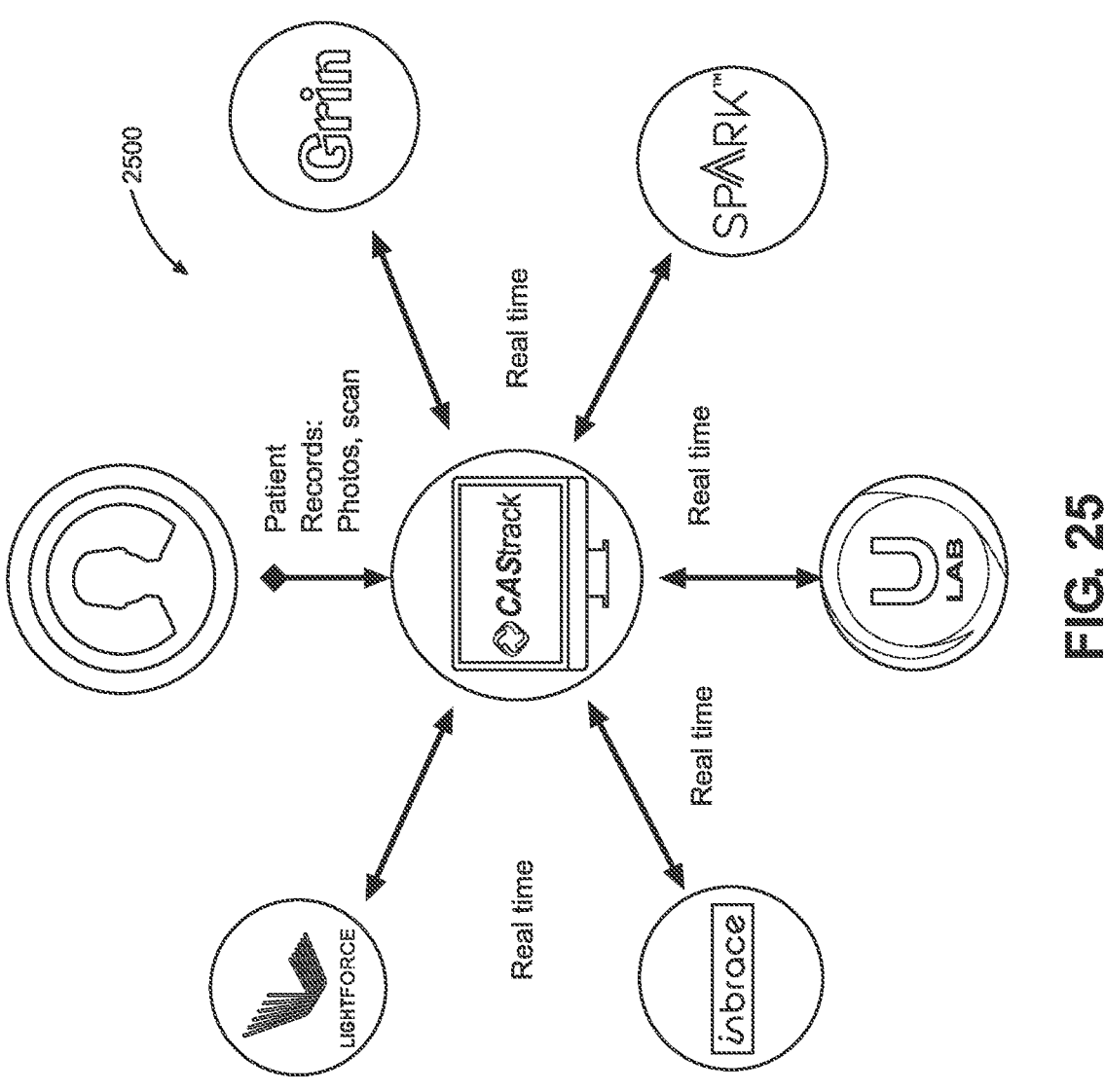
FIG. 25 illustrates a centralized digital workflow platform for chronologically tracking patient dental treatment modalities, in accordance with various embodiments of the present technology.

FIG. 25 illustrates a centralized digital workflow platform 2500 for chronologically tracking patient dental treatment modalities, in accordance with various embodiments of the present technology. In various embodiments the centralized digital workflow platform 2500 enables the following functionalities including: real-time alerts/notifications in the centralized digital workflow platform 2500 (e.g., CAStrack) when an action is required of the digital companies; access to a treatment card and treatment planning tools of the digital companies directly through the centralized digital workflow platform 2500 (e.g., CAStrack); tracking a treatment status of patients and records of patients from the digital companies within the centralized digital workflow platform 2500 (e.g., CAStrack); and syncing of treatment status updates of patients from the digital companies to be displayed within the centralized digital workflow platform 2500 (e.g., CAStrack).

Figure 26:
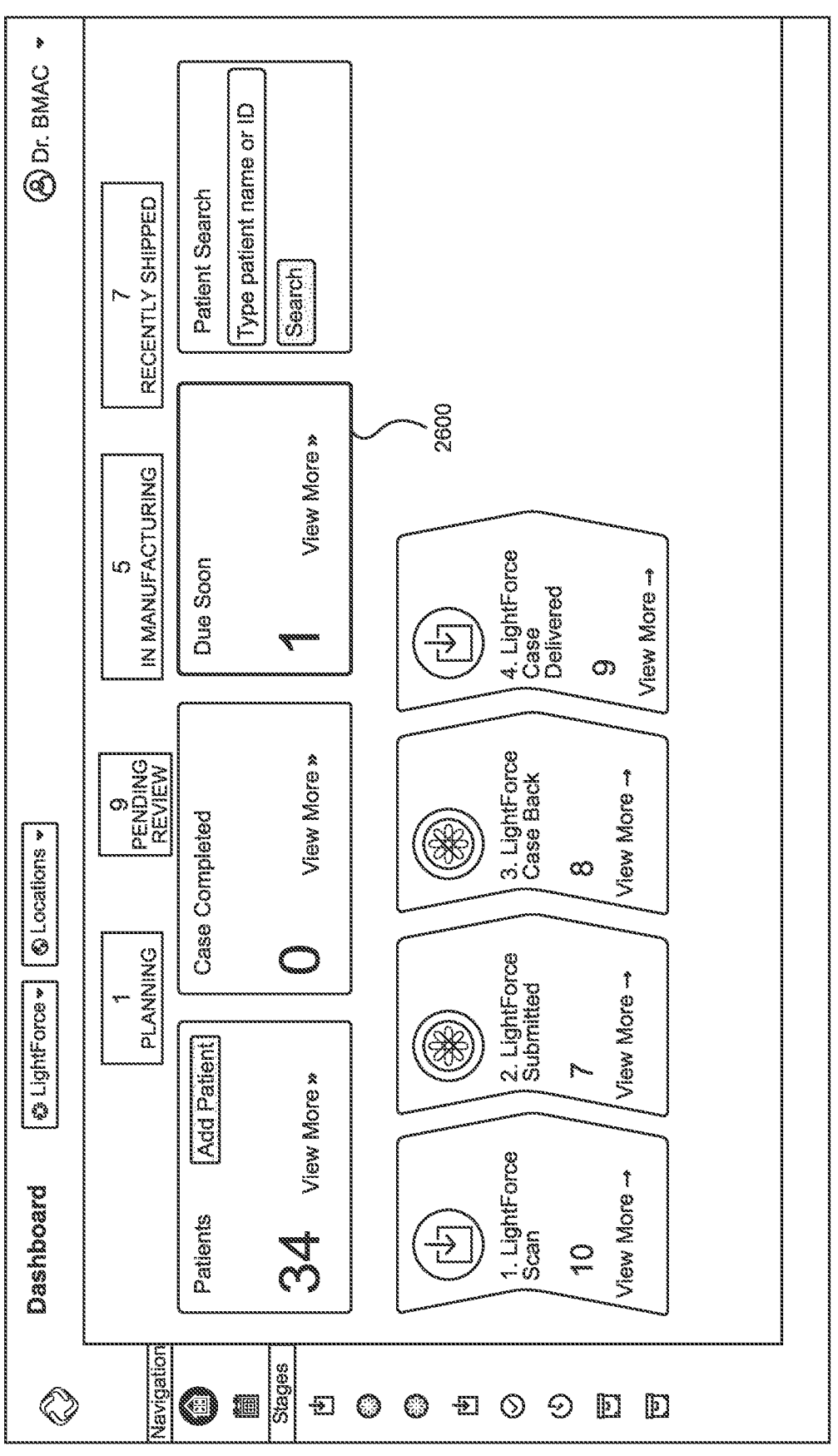
FIG. 26 illustrates a graphical user interface for chronologically tracking patient dental treatment modalities for a plurality of patients including dental aligner production and manufacture showing a fourth row of cells containing a fourth subject heading displaying a due soon status, the due soon status being a due soon status for the chronologically tracking patient dental treatment modalities for a plurality of patients, in accordance with various embodiments of the present technology.

FIG. 26 illustrates a graphical user interface for chronologically tracking patient dental treatment modalities for a plurality of patients including dental aligner production and manufacture showing a fourth row of cells containing a fourth subject heading displaying a due soon status 2600, the due soon status 2600 being a due soon status for the chronologically tracking patient dental treatment modalities for a plurality of patients, in accordance with various embodiments of the present technology. For example, methods may include displaying a graphical user interface for the chronologically tracking patient dental treatment modalities for the plurality of patients, the graphical user interface for the chronologically tracking patient dental treatment modalities for the plurality of patients comprising: a fourth row of cells containing a fourth subject heading displaying a due soon status 2600, the due soon status being a due soon status for the chronologically tracking patient dental treatment modalities for a plurality of patients.

FIG. 27 illustrates a graphical user interface for chronologically tracking patient dental treatment modalities for a plurality of patients including displaying patient data 2700, in accordance with various embodiments of the present technology.

FIG. 28 illustrates a graphical user interface for chronologically tracking patient dental treatment modalities for a plurality of patients showing a calendar view 2800 for the chronologically tracking patient dental treatment modalities for a plurality of patients, the calendar view including reminders corresponding to the due soon status. For example, methods may include displaying a graphical user interface for the chronologically tracking patient dental treatment modalities for the plurality of patients, the graphical user interface for the chronologically tracking patient dental treatment modalities for the plurality of patients comprising: a calendar view 2800 for the chronologically tracking patient dental treatment modalities for a plurality of patients, the calendar view including reminders corresponding to the due soon status.

In the description, for purposes of explanation and not limitation, specific details are set forth, such as particular embodiments, procedures, techniques, and so forth, in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for chronologically tracking patient dental treatment modalities for a plurality of patients including dental aligner production and manufacture, the method comprising:

receiving an intra-oral scan including starting teeth positions of a patient and a date of the intra-oral scan;

receiving a treatment plan including desired teeth positions of the patient based on the intra-oral scan;

generating a series of modified teeth positions from the starting teeth positions based on the treatment plan, the series of modified teeth positions from the starting teeth positions being incremental changes from the starting teeth positions to the desired teeth positions;

displaying a three-dimensional model of the series of modified teeth positions from the starting teeth positions, the three-dimensional model being used to fabricate a dental device that causes the starting teeth positions of the patient to physically change to the desired teeth positions according to the treatment plan; and displaying a graphical user interface for the chronologically tracking patient dental treatment modalities for the plurality of patients, the graphical user interface enforcing and visualizing a critical path workflow for dental aligner production and manufacture for the chronologically tracking patient dental treatment modalities for the plurality of patients, the graphical user interface comprising:

a first row of cells containing a first subject heading displaying pending review status, the pending review status being a status of doctor evaluation of the treatment plan for the patient dental treatment modalities including the desired teeth positions of the patient based on the intra-oral scan whereby the first row represents an initial stage in the critical path workflow;

a second row of cells containing a second subject heading displaying manufacturing status, the manufacturing status being a status of manufacturing of the dental device, the dental device causing the series of modified teeth positions from the starting teeth positions and causing the incremental changes from the starting teeth positions to the desired teeth positions, whereby the second row is integrated with the first row such that manufacturing operations are prevented until completion of the pending review status, thereby enforcing the critical path workflow dependency between doctor review and manufacturing; and a third row of cells containing a third subject heading displaying a shipping status, the shipping status being a status of shipping of the dental device based on the patient dental treatment modalities, whereby the third row is integrated with the second row such that shipping status operations are prevented until completion of the manufacturing status, thereby enforcing the critical path workflow dependency between manufacturing and shipping.

2. The method of claim 1, wherein the displaying the graphical user interface for the chronologically tracking patient dental treatment modalities including dental aligner production and manufacture for the plurality of patients further comprises:

a fourth row of cells containing a fourth subject heading displaying a due soon status, the due soon status being a status of being due soon for the chronologically tracking patient dental treatment modalities for a plurality of patients.

3. The method of claim 2, wherein the displaying the graphical user interface for the chronologically tracking patient dental treatment modalities including dental aligner production and manufacture for the plurality of patients further comprises:

a calendar view for the chronologically tracking patient dental treatment modalities for a plurality of patients, the calendar view including reminders corresponding to the due soon status.

4. The method of claim 3, wherein the patient dental treatment modalities for the plurality of patients comprises at least one of: custom braces, custom retainers, digital communication applications, commercial clear aligner communications from a digital company, and an in-house dental aligner.

5. The method of claim 1, wherein the displaying the three-dimensional model of the series of modified teeth positions from the starting teeth positions comprises loading a patient record for the treatment plan.

6. The method of claim 5, wherein the patient record comprises at least one of: an intra-oral photograph, an extra-oral photograph, a digital scan, a digital model, a radiograph, and a document pertaining to a patient record.

7. The method of claim 6, further comprising:
sending the patient record to a digital company;
receiving a communication from the digital company in response to the sending the patient record to the digital company; and
initiating a modification of the treatment plan based on the receiving the communication from the digital company in response to the sending the patient record to the digital company;
wherein the initiating the modification of the treatment plan is a bilateral real time syncing between the digital company and a centralized digital workflow platform.

8. The method of claim 1, wherein the intra-oral scan is received from an intraoral scanner, the scanner providing the starting teeth positions of the patient.

9. The method of claim 1, further comprising printing, using a three-dimensional printer, the dental device causing the series of modified teeth positions from the starting teeth positions and causing the incremental changes from the starting teeth positions to the desired teeth positions.

10. A system for chronologically tracking patient dental treatment modalities for a plurality of patients including dental aligner production and manufacture, the system comprising:
an intraoral scanner generating an intra-oral scan including starting teeth positions of a patient and a date of the intra-oral scan;
at least one processor; and
a memory storing processor-executable instructions, wherein the at least one processor is configured to implement the following operations upon executing the processor-executable instructions:
receiving a treatment plan including desired teeth positions of the patient based on the intra-oral scan;
generating a series of modified teeth positions from the starting teeth positions based on the treatment plan, the series of modified teeth positions from the starting teeth positions being incremental changes from the starting teeth positions to the desired teeth positions; and
displaying a three-dimensional model of the series of the modified teeth positions from the starting teeth positions, the three-dimensional model being used to fabricate a dental device that causes the starting teeth positions of the patient to physically change to the desired teeth positions according to the treatment plan;
a graphical user interface for the chronologically tracking patient dental treatment modalities for the plurality of patients, the graphical user interface enforcing and visualizing a critical path workflow for the dental aligner production and manufacture for the chronologically tracking patient dental treatment modalities for the plurality of patients, the graphical user interface displaying:
a first row of cells containing a first subject heading displaying pending review status, the pending review status being a status of doctor evaluation of the treatment plan for the patient dental treatment modalities including the desired teeth positions of the patient based on the intra-oral scan, whereby the first row represents an initial stage in the critical path workflow;
a second row of cells containing a second subject heading displaying manufacturing status, the manufacturing status being a status of manufacturing of the dental device, the dental device causing the series of modified teeth positions from the starting teeth positions and causing the incremental changes from the starting teeth positions to the desired teeth positions, whereby the second row is integrated with the first row such that manufacturing operations are prevented until completion of the pending review status, thereby enforcing the critical path workflow dependency between doctor review and manufacturing; and
a third row of cells containing a third subject heading displaying a shipping status, the shipping status being a status of shipping of the dental device based on the patient dental treatment modalities, whereby the third row is integrated with the second row such that shipping status operations are prevented until completion of the manufacturing status, thereby enforcing the critical path workflow dependency between manufacturing and shipping.

11. The system of claim 10, wherein the displaying the graphical user interface for the chronologically tracking patient dental treatment modalities including dental aligner production and manufacture for the plurality of patients further comprises:
a fourth row of cells containing a fourth subject heading displaying a due soon status, the due soon status being a status of being due soon for the chronologically tracking patient dental treatment modalities for a plurality of patients.

12. The system of claim 11, wherein the displaying the graphical user interface for the chronologically tracking patient dental treatment modalities including dental aligner production and manufacture for the plurality of patients further comprises:
a calendar view for the chronologically tracking patient dental treatment modalities for a plurality of patients, the calendar view including reminders corresponding to the due soon status.

13. The system of claim 12, wherein the patient dental treatment modalities for the plurality of patients comprises at least one of: custom braces, custom retainers, digital communication applications, commercial clear aligner communications from a digital company, and an in-house dental aligner.

14. The system of claim 13, wherein the displaying the three-dimensional model of the series of modified teeth positions from the starting teeth positions comprises loading a patient record for the treatment plan.

15. The system of claim 14, wherein the patient record comprises at least one of: an intra-oral photograph, an extra-oral photograph, a digital scan, a digital model, a radiograph, and a document pertaining to a patient record.

16. The system of claim 15, wherein the at least one processor is further configured to implement the following operations upon executing the processor-executable instructions:

sending the patient record to a digital company;

receiving a communication from the digital company in response to the sending the patient record to the digital company; and initiating a modification of the treatment plan based on the receiving the communication from the digital company in response to the sending the patient record to the digital company;

wherein the initiating the modification of the treatment plan is a bilateral real time syncing between the digital company and a centralized digital workflow platform.

17. The system of claim 10, further comprising a three-dimensional printer, the three-dimensional printer printing the dental device causing the series of modified teeth positions from the starting teeth positions and causing the incremental changes from the starting teeth positions to the desired teeth positions.

18. A non-transitory computer readable medium having embodied thereon instructions being executable by at least one processor to perform operations for chronologically tracking patient dental treatment modalities for a plurality of patients including dental aligner production and manufacture, the operations comprising:

receiving an intra-oral scan including starting teeth positions of a patient and a date of the intra-oral scan;

receiving a treatment plan including desired teeth positions of the patient based on the intra-oral scan;

generating a series of modified teeth positions from the starting teeth positions based on the treatment plan, the series of modified teeth positions from the starting teeth positions being incremental changes from the starting teeth positions to the desired teeth positions;

displaying a three-dimensional model of the series of modified teeth positions from the starting teeth positions, the three-dimensional model being used to fabricate a dental device that causes the starting teeth positions of the patient to physically change to the desired teeth positions according to the treatment plan; and displaying a graphical user interface for the chronologically tracking patient dental treatment modalities for the plurality of patients, the graphical user interface for the chronologically tracking patient dental treatment modalities for the plurality of patients comprising:

a first row of cells containing a first subject heading displaying pending review status, the pending review status being a status of doctor evaluation of the treatment plan for the patient dental treatment modalities including the desired teeth positions of the patient based on the intra-oral scan, whereby the first row represents an initial stage in the critical path workflow;

a second row of cells containing a second subject heading displaying manufacturing status, the manufacturing status being a status of manufacturing of the dental device, the dental device causing the series of modified teeth positions from the starting teeth positions and causing the incremental changes from the starting teeth positions to the desired teeth positions, whereby the second row is integrated with the first row such that manufacturing operations are prevented until completion of the pending review status, thereby enforcing the critical path workflow dependency between doctor review and manufacturing; and a third row of cells containing a third subject heading displaying a shipping status, the shipping status being a status of shipping of the dental device based on the patient dental treatment modalities, whereby the third row is integrated with the second row such that shipping status operations are prevented until completion of the manufacturing status, thereby enforcing the critical path workflow dependency between manufacturing and shipping.

19. The non-transitory computer readable medium of claim 18, wherein the displaying the three-dimensional model of the series of modified teeth positions from the starting teeth positions comprises loading a patient record for the treatment plan;

wherein the patient record comprises at least one of: an intra-oral photograph, an extra-oral photograph, a digital scan, a digital model, a radiograph, and a document pertaining to a patient record;

wherein the operations further comprise:

sending the patient record to a digital company;

receiving a communication from the digital company in response to the sending the patient record to the digital company; and initiating a modification of the treatment plan based on the receiving the communication from the digital company in response to the sending the patient record to the digital company;

wherein the initiating the modification of the treatment plan is a bilateral real time syncing between the digital company and a centralized digital workflow platform.

20. The non-transitory computer readable medium of claim 18, wherein the operations further comprise:

printing, using a three-dimensional printer, the dental device causing the series of modified teeth positions from the starting teeth positions and causing the incremental changes from the starting teeth positions to the desired teeth positions.

* * * * *